US012591766B1

(12) United States Patent
Coffey et al.

(10) Patent No.: US 12,591,766 B1
(45) Date of Patent: Mar. 31, 2026

(54) APPLICATION PROGRAMMING INTERFACE WITH GENERATIVE RESPONSE ENGINE STATE MANAGEMENT

(71) Applicant: OpenAI OpCo, LLC., San Francisco, CA (US)

(72) Inventors: Steve Coffey, San Francisco, CA (US); Nikunj Handa, San Francisco, CA (US); Manoli Liodakis, San Francisco, CA (US)

(73) Assignee: OpenAI OpCo, LLC., San Francisco, CA (US)

( * ) Notice: Subject to any disclaimer, the term of this patent is extended or adjusted under 35 U.S.C. 154(b) by 0 days.

(21) Appl. No.: 19/223,685

(22) Filed: May 30, 2025

(51) Int. Cl.
*G06N 3/0475* (2023.01)
(52) U.S. Cl.
CPC .................................. *G06N 3/0475* (2023.01)
(58) Field of Classification Search
CPC .............................. G06N 3/0475; G06N 3/045
See application file for complete search history.

(56) References Cited

U.S. PATENT DOCUMENTS

| | | | | |
|---|---|---|---|---|
| 12,332,841 B1 * | 6/2025 | Hoagland | ............... | G06F 16/16 |
| 2023/0259705 A1 * | 8/2023 | Tunstall-Pedoe | .... | G06N 3/0499 |
| | | | | 704/9 |
| 2024/0427999 A1 * | 12/2024 | Newman | ............... | G06F 16/955 |
| 2025/0045304 A1 * | 2/2025 | Quatro | ................... | G06N 20/00 |
| 2025/0094734 A1 * | 3/2025 | Sridharan | ............... | G06F 9/453 |
| 2025/0094735 A1 * | 3/2025 | Saikia | ...................... | G06F 40/40 |
| 2025/0147954 A1 * | 5/2025 | Billman | ............... | G06F 16/243 |
| 2025/0199757 A1 * | 6/2025 | Seibel | ..................... | G06F 40/40 |
| 2025/0245124 A1 * | 7/2025 | Jones | .................. | G06F 11/3608 |

OTHER PUBLICATIONS

Li, Minghao, et al. "Api-bank: A comprehensive benchmark for tool-augmented llms." arXiv preprint arXiv:2304.08244 (2023). (Year: 2023).*
Sen, Rajat Sandeep, et al. "Simple Action Model: Enabling LLM to Sequential Function Calling Tool Chain." 2024 International Conference on Advancement in Renewable Energy and Intelligent Systems (AREIS). IEEE, 2024. (Year: 2024).*
Chen, Xiang, et al. ("An Empirical Study of OpenAI API Discussions on Stack Overflow" preprint arXiv:2505.04084v1 (May 7, 2025) (Year: 2025).*
Kabbay, Harcharan Singh. "Streamlining AI Application: MLOps Best Practices and Platform Automation Illustrated through an Advanced RAG based Chatbot." 2024 2nd International Conference on Sustainable Computing and Smart Systems (ICSCSS). IEEE, 2024. (Year: 2024).*

* cited by examiner

*Primary Examiner* — Randall K. Baldwin
(74) *Attorney, Agent, or Firm* — Polsinelli PC

(57) ABSTRACT

The present technology pertains to an API for state management and function chaining using a generative response engine. The present technology includes an API which takes a response ID as a parameter. The response ID can be used to retrieve a chain of responses including the previous response and any preceding responses, which is provided to the context window of an artificial intelligence (AI) model of the generative response engine. Additionally, the API can be used to enforce constrained sampling by the AI model to enable tool chaining without repetitive programming.

20 Claims, 12 Drawing Sheets

~600

RECEIVE, FROM A CLIENT APPLICATION VIA AN APPLICATION PROGRAMMING INTERFACE (API), A REQUEST INCLUDING A PROMPT FOR AN AI MODEL OF A GENERATIVE RESPONSE ENGINE AND A RESPONSE ID 602

RETRIEVE, BY THE GENERATIVE RESPONSE ENGINE, A CHAIN OF RESPONSES IN A SEQUENCE THAT ENDS WITH THE RESPONSE HAVING THE RESPONSE ID FROM A DATABASE 604

PASS, TO THE AI MODEL, THE PROMPT AND THE STATE REPRESENTATION 606

RECEIVE, BY THE API FROM THE GENERATIVE RESPONSE ENGINE, A RESPONSE TO THE PROMPT AND A SECOND RESPONSE ID CORRESPONDING TO THE RESPONSE 608

200

CONTROLLER 212

STATE DATABASE 208

PROCESSING UNIT 202

MEMORY 204

TASK AGENT 206

AI MODEL(S) 110

CONTEXT WINDOW 210

SYSTEM MESSAGE 216

RESPONSE DATA 214

300

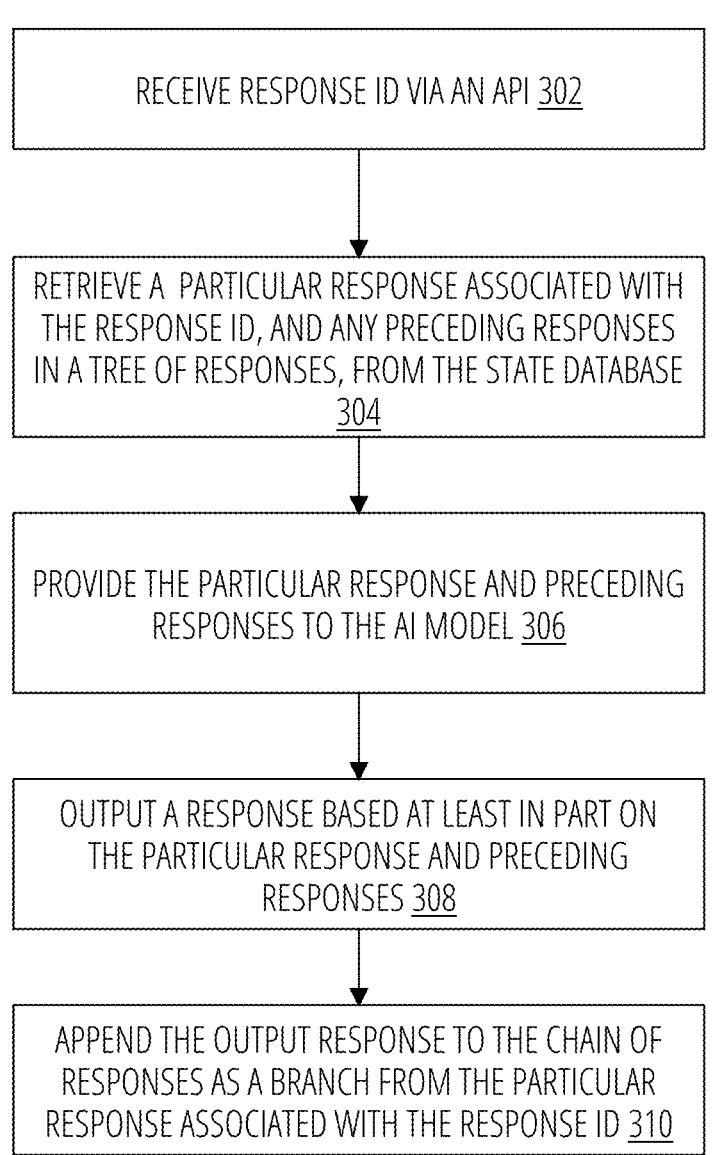

RECEIVE RESPONSE ID VIA AN API 302

RETRIEVE A PARTICULAR RESPONSE ASSOCIATED WITH THE RESPONSE ID, AND ANY PRECEDING RESPONSES IN A TREE OF RESPONSES, FROM THE STATE DATABASE 304

PROVIDE THE PARTICULAR RESPONSE AND PRECEDING RESPONSES TO THE AI MODEL 306

OUTPUT A RESPONSE BASED AT LEAST IN PART ON THE PARTICULAR RESPONSE AND PRECEDING RESPONSES 308

APPEND THE OUTPUT RESPONSE TO THE CHAIN OF RESPONSES AS A BRANCH FROM THE PARTICULAR RESPONSE ASSOCIATED WITH THE RESPONSE ID 310

FIG. 3A

600

RECEIVE, FROM A CLIENT APPLICATION VIA AN APPLICATION PROGRAMMING INTERFACE (API), A REQUEST INCLUDING A PROMPT FOR AN AI MODEL OF A GENERATIVE RESPONSE ENGINE AND A RESPONSE ID <u>602</u>

RETRIEVE, BY THE GENERATIVE RESPONSE ENGINE, A CHAIN OF RESPONSES IN A SEQUENCE THAT ENDS WITH THE RESPONSE HAVING THE RESPONSE ID FROM A DATABASE <u>604</u>

PASS, TO THE AI MODEL, THE PROMPT AND THE STATE REPRESENTATION <u>606</u>

RECEIVE, BY THE API FROM THE GENERATIVE RESPONSE ENGINE, A RESPONSE TO THE PROMPT AND A SECOND RESPONSE ID CORRESPONDING TO THE RESPONSE <u>608</u>

FIG. 6

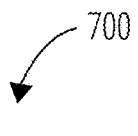

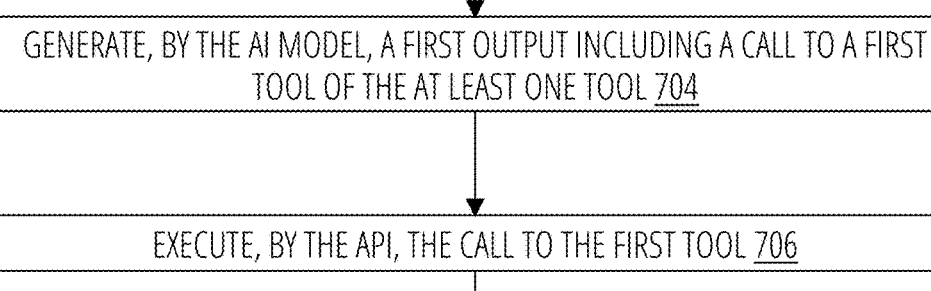

RECEIVE, BY A GENERATIVE RESPONSE ENGINE FROM A CLIENT APPLICATION VIA AN API, A REQUEST TO RESPOND TO A PROMPT, WHERE THE PROMPT DEFINES A TASK SUCH THAT RESPONDING TO THE PROMPT WOULD BENEFIT FROM AN AI MODEL OF THE GENERATIVE RESPONSE ENGINE CALLING AT LEAST ONE TOOL 702

GENERATE, BY THE AI MODEL, A FIRST OUTPUT INCLUDING A CALL TO A FIRST TOOL OF THE AT LEAST ONE TOOL 704

EXECUTE, BY THE API, THE CALL TO THE FIRST TOOL 706

PROVIDE, TO THE AI MODEL FROM THE API, A RESULT OF CALLING THE FIRST TOOL 708

GENERATE, BY THE AI MODEL, A SECOND OUTPUT THAT INCLUDES AN END TURN TOKEN 710

PROVIDE, VIA THE API, THE SECOND OUTPUT TO THE CLIENT APPLICATION BASED ON RECEIPT, BY THE API, OF THE END TURN TOKEN 712

FIG. 7

APPLICATION PROGRAMMING INTERFACE WITH GENERATIVE RESPONSE ENGINE STATE MANAGEMENT

BACKGROUND

Generative response engines such as language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

FIG. 3A illustrates an example process for recalling a previous state of an AI model in accordance with some aspects of the present technology.

FIG. 6 illustrates a method for using a response ID to dictate a state of the AI model in accordance with some aspects of the present technology.

FIG. 7 illustrates a method for agentic looping to call and implement one or more tools by the AI model prior to providing a response to a client application in accordance with some aspects of the present technology.

DETAILED DESCRIPTION

Figure 1:
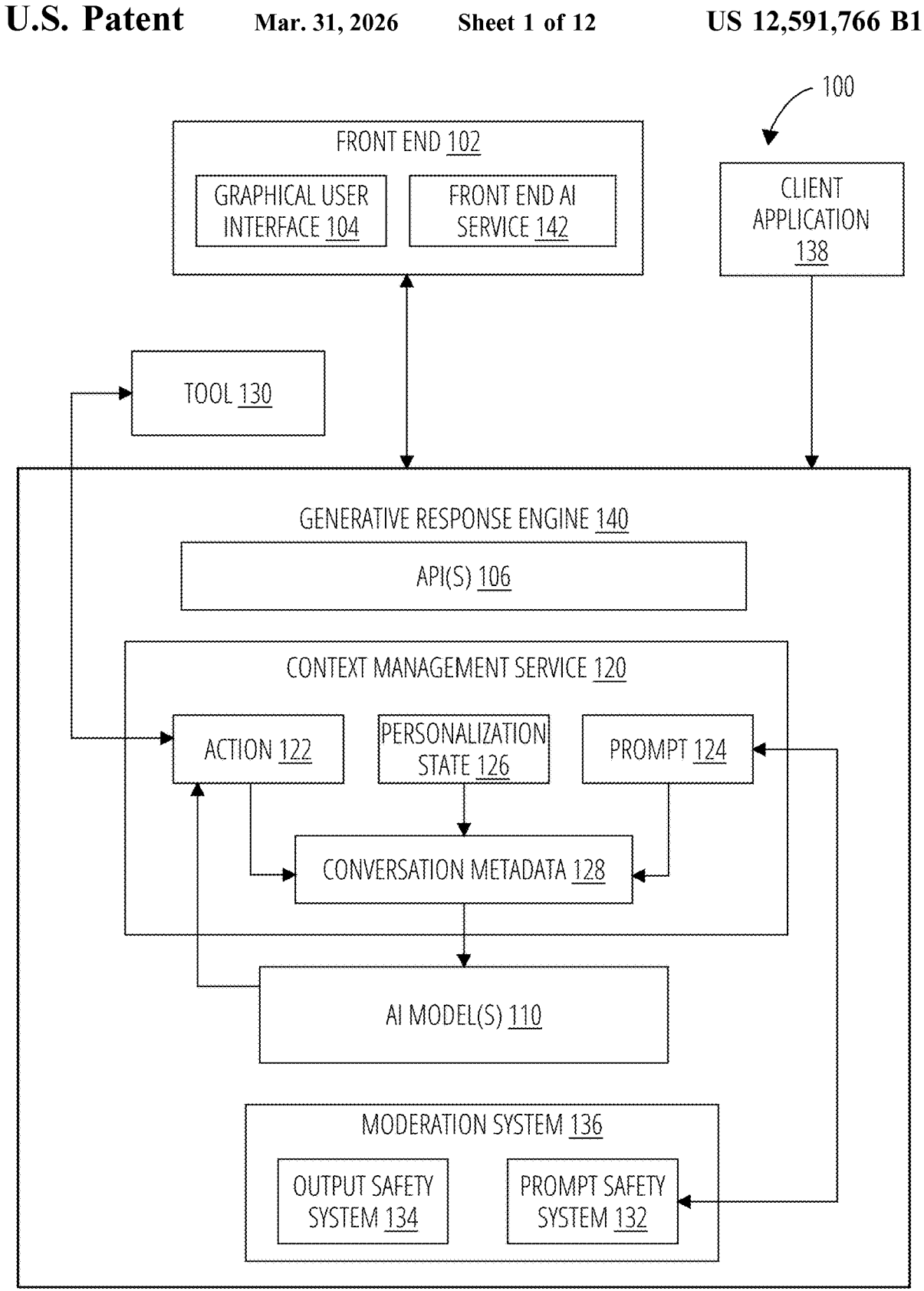
FIG. 1 illustrates an example system supporting a generative response engine during inference operations in accordance with some aspects of the present technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

AI models such as language models represent a significant milestone in the field of artificial intelligence, revolutionizing computer-based natural language understanding and generation. AI models, powered by advanced deep learning techniques, have demonstrated astonishing capabilities in tasks such as text generation, translation, summarization, and even code generation.

AI models can be powerful tools and can be leveraged by other software or applications. To do this, developers may use application programming interfaces (APIs) to programmatically interact with the generative response engine. Despite facilitating interactions with AI models, API calls can cost time and processing resources. Further, inefficient API calls can result in increased overhead during the software development process, as developers have to figure out how to optimize the available APIs despite their limitations.

State management also remains a challenge when using AI models. AI models can be unpredictable and output can be difficult to replicate. Thus, developers and users may not be able to return an AI model to a previous state. For example, once an AI model returns output, it is difficult to return the AI model to a state that the AI model was in prior to returning the output without the context of the output.

The present technology aims to address these and other challenges associated with APIs of a generative response engine. For example, the present technology enables state management via API by accepting a response ID as a parameter. Thus, when calling an API, a response ID can be provided by the calling client application to an AI model of the generative response engine. The response ID can be associated with a response in a tree of responses stored by a database such that the response ID causes the response and preceding responses (i.e., a chain of responses in the tree) to be retrieved and provided in the context window of the AI model. Accordingly, by using a response ID, the AI model can be returned to a previous state.

A context window is a critical component that allows the AI model to process and understand a segment of text or tokens (i.e., a unit of data that the AI model processes, which may be commonly characters or word segments, visual representations, and audio representations) related to a task defined by a prompt. This segment can include a variety of data types to provide comprehensive context, which enhances the AI model's ability to generate accurate and relevant responses. Examples of data that may be included within a context window are system instructions, which consist of guidelines or directives that shape the model's behavior; chat threads, which are previous turns in a conversation that provide continuity in dialogue; images, audio, documents or portions thereof, which the model may reference or extract information from; results from tool calls, which supply outputs that the model can utilize for additional context; and user queries, which include current or past inquiries that guide ongoing interactions. The size and constitution of the context window are pivotal for enabling the language model to maintain coherence and relevance, thereby impacting its overall effectiveness in processing and generating text. In layman's terms, the context window includes all information that the AI model receives as input to guide an inference operation.

As an example, a user account can input a prompt via an application, where the prompt is "Tell me a joke." The prompt can be provided to the AI model via an API of the generative response engine. The AI model may output a joke to be provided to the user account via the application. In a subsequent prompt, the user account may say "Explain why the joke is funny." The API calling the AI model of the generative response engine may take this prompt and a response ID of the previous response (i.e., the joke) as input to be passed to the AI model. The AI model (or the generative response engine) can use the response ID to retrieve the previous response (i.e., the joke) from a database, such that AI model can receive the previous response as context via its context window. The output of the AI model may be based, at least in part, on this context. Accordingly, the AI model can provide more accurate output in response to the prompt based on the context of the previous response.

The present technology also facilitates agentic looping and function chaining to streamline and reduce the number of API calls needed to complete a task using an AI model of the generative response engine. In this regard, the present technology addresses at least two problems that LLMs commonly face. First, the outputs of the AI model are probabilistic, which means, that it is not generally possible to be assured of a particular output. Therefore, even when a tool call is explicitly requested in a prompt, an API caller cannot be sure that that AI model will call the tool. The present technology addresses this problem by including a parameter in the API for a predefined tool that can result in constrained sampling by the AI model to force the AI model to output a tool call. The tool call can be provided to the API such that the API can call the tool using the output tool call. Additionally, the present technology makes tool calling easier. Generally, after a tool call, the API caller would need to receive the result of the tool call and provide that into the context window of the generative response engine. This can be inefficient, especially when multiple tool calls are made to eventually perform a single task. The present technology solves this problem by enabling the AI model to output tool calls, receive tool call responses directly, and make additional tool calls until the generative response engine outputs an end turn token as part of a response. Upon receipt of the end turn token, the API can provide the response to the application. Thus, multiple API calls are not required to need continually prompt the AI model to output tool calls and does not provide a response until the function of the predefined tool is completed as determined by the AI model. For example, developers can use the disclosed API to call tools in a single flow rather than using separate APIs for different tools or modalities. The AI model is able to decide to call multiple tools, and decide an order in which to call those tools, and utilize the outputs of multiple tool calls to provide a response to a single API call.

Accordingly, aspects of the present technology provide a single, simplified interface through which developers can interact with AI model across text, audio, and image modalities, while seamlessly invoking external tools such as code interpreters, document retrieval systems, and web browsers. Unlike prior approaches that required extensive orchestration through multiple API calls and manually maintained context, the present technology supports multi-turn, reasoning-driven interactions with built-in server-side state management. Developers can reference previous outputs via lightweight identifiers (e.g., the response ID), enabling workflows such as reasoning backtracking, alternate conversational forks, and complex task orchestration. The present technology further facilitates the development of agentic systems in which the model can autonomously determine which tools to call to fulfill a user's objective, thereby reducing developer overhead and enhancing usability.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example AI assistant service supporting a generative response engine during inference operations in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

AI model(s) 110 are an artificial intelligence (AI) that can generate content in response to a prompt. The prompt can be from a human or a software entity (AI or applications, such as client application 138). The prompt is generally in natural language but could be in code, including binary. Some examples of AI model(s) 110 can include language models that generate language, such as CHATGPT, or other models, such as DALL-E or IMAGEGEN, which generates images, and SORA, which generates videos. CHATGPT, DALL-E, IMAGEGEN, and SORA are all provided by OPENAI, but the AI model(s) 110 are not limited to AI provided by OPENAI. AI model(s) 110 can also be any type of generative AI and can include AI developed using various architectures such as diffusion models and transformers (e.g., autoregressive transformer architecture) and combinations of models. Some AI models are multi-modal models which can receive and output data in text, image, audio, etc.

In some instances, a language model, such as CHATGPT, can receive prompts to output images, video, code, applications, etc., which it can provide by interfacing with one or more other models, as will be addressed further herein.

AI model(s) 110 may be part of a generative response engine 140, where generative response engine 140 may include one or more components for supporting interaction with AI model(s) 110. Users can interact with generative response engine 140 through a front end 102 and applications can interact with generative response engine 140 through APIs 106. Front end 102 serves as the interface and intermediary between the user and generative response engine 140. It encompasses a graphical user interface 104 which may be used to provide input that facilitate communication with generative response engine 140 and AI model(s) 110. Generally, users interact through a graphical user interface 104 that often includes a conversational interface, and applications interact through the API 106, but this is not a requirement.

While some components are shown as being part of generative response engine 140 and some are outside of generative response engine 140, this is for illustration purposes only and some components such as tool 130 might be part of generative response engine 140, and some components such as moderation system 136 might be outside of generative response engine 140. As used herein, generative response engine 140 encompasses deterministic services that are first party services that prepare prompts to be sent to AI models, that are primitive level services that AI model(s)

110 can utilize to generate a response to a prompt. Services that are outside of generative response engine 140 are logically separate. For example, front end 102 might be a first party front end (provided by the same party that provides generative response engine 140) but front end 102 is used to interface with generative response engine 140 rather than aid in developing a response to a prompt.

Some components of generative response engine 140 might be executed by computing programming units (CPU), and some components might be executed by graphical processing units (e.g., AI model(s) 110).

In some embodiments, client application 138 might provide a graphical user interface that is custom to client application 138 or can display graphical user interface 104 provided by generative response engine 140 provider.

Graphical user interface 104 is the platform through which users interact with the generative response engine 140. It can be a web-based chat window, an application, or any interface that supports data input and output. Graphical user interface 104 facilitates a conversation between the user and AI model(s) 110, as the user provides prompts in graphical user interface 104 to which AI model(s) 110 respond and generative response engine 140 presents those responses in graphical user interface 104. In some aspects, graphical user interface 104 presents a conversational interface, which has attributes of a conversation thread between a user account and AI model(s) 110.

Graphical user interface 104 is configured to perform input handling and output presentation. The type of inputs that can be received can be relative to the specifics of generative response engine 140 and/or AI model(s) 110. For example, a language model is generally configured to accept text, but when the AI model is a multi-modal AI model, front end 102 can accept voice and images/video.

In some aspects, front end 102 can be a layer to accept any inputs, provide the inputs to generative response engine 140, receive outputs from generative response engine 140 and display the outputs. Graphical user interface 104 can accept any input types as part of the prompt, and front end AI service 142 can determine which AI model or collection of AI models are best suited to respond to the prompt. Front end AI service 142 can be one or more AI models that can be trained to not only determine which AI model should be used to respond to a prompt, but in some examples, can be used to improve prompts or provide additional configuration details, such as how long a reasoning model should spend processing a prompt. In general, front end AI service 142 can support functions of graphical user interface 104 by performing interference operations before a prompt is sent to generative response engine 140. Generally graphical user interface 104 is present on a client device, while front end AI service 142 might be present on the same client device or on a server in a data center.

Graphical user interface 104 is also configured to maintain the context of the conversation, which allows for coherent and relevant responses. For example, graphical user interface 104 is responsible for providing the conversation thread and other relevant context accessible to the front end 102 to the AI models along with the specific prompt. In an example, a conversation between the user account and the AI model(s) 110 can have taken several turns (prompt, response, prompt, response, etc.). When the user account provides a further prompt, the graphical user interface 104 can provide that prompt to AI model(s) 110 in the context of the entire conversation.

In another example, graphical user interface 104 might be configured to provide a system prompt along with a user-provided prompt. A system prompt is hidden from the user account and is used to set the behavior and guidelines for the AI model. The system prompt can be used to define the AI's persona, style, and constraints. There can be levels of system prompts. A highest level of a system prompt might be provided by the AI model(s) 110 provider and is meant to establish policies for the behavior of AI model(s) 110. This highest level of system prompt should be prohibited from being edited. A customization system prompt can be used to customize the behavior of the AI model and is often provided through an API call, or provided by a user account when creating a customized version of AI model(s) 110. A still lower level of system prompt might include hidden information about a task. This can include chain-of-thought from a reasoning model, or context about an application that AI model(s) 110 is working with to complete a task. Accordingly, graphical user interface 104 does not always display all of the output of the AI model.

Graphical user interface 104 is also configured to display the responses from the AI model, which might include text, code snippets, images, or interactive elements.

In some aspects, AI model(s) 110 can provide instructions to front end 102 that instruct graphical user interface 104 about how to display some of the output from the AI model. For example, the AI model and/or generative response engine can direct graphical user interface 104 to present code in a code-specific format, or to present interactive graphics, or static images. In other examples, the AI model and/or generative response engine can direct graphical user interface 104 to present an interactive document editor where graphical user interface 104 can be presented with the document editor so that the user account and the AI model can collaborate on the document.

In some aspects, AI model(s) 110 can provide instructions to personalization state 126 to record facts in a personalization notepad. Personalization state 126 can store information received directly from the user account or inferred from prompts provided by the user account, and can be used to provide context to the AI model such that output is personalized for the user account. In some examples, front end 102 can be configured to notify the user account that a memory was created. Personalization state 126 can also include summaries of past conversation threads between the user account and the generative response engine 140, and/or a searchable index of past conversations threads. In this way, personalization state 126 aid generative response engine 140 and/or AI model(s) 110 to not only learn specific facts about a user account, but to recall past interactions. The past interactions can be used to guide future responses by generative response engine 140 and/or AI model(s) 110 such that generative response engine 140 and/or AI model(s) 110becomes personalized to a particular user account.

Generative response engine 140 can provide one or more application programming interfaces (API(s)) 106. APIs enable developers to integrate the AI model's capabilities into external applications and services. APIs 106 provide programmatic access to generative response engine 140, allowing for customized interactions and functionalities. While APIs 106 are shown as part of generative response engine 140, in some examples, APIs 106 are part of front end 102. API 106 can refer to points of access to AI model(s) 110. In some examples, API 106 endpoints are located at context management service 120.

APIs 106 can accept structured requests containing prompts, context, and configuration parameters. For example, an API can be used to provide prompts and divide the prompt into system prompts and user prompts. In some aspects, APIs 106 can provide specific inputs for which AI model(s) 110 are configured to respond with a specific behavior. For example, an API can be used to specify that it requires an output in a particular format or structured output. For example, in the chat completion API, the API call can specify parameters for the output, such as the max length for the desired output, and specify aspects of the tone of the language used in the response. Some common APIs are for participating in a conversation (Chat Completion API), for providing a single response (Completion API), for converting text into embeddings (Embeddings API), etc. The API can also be used to indicate specific decision boundaries that AI model(s) 110 might be trained to interpret. For example, the moderation API can take advantage of AI assistant service 100's content moderation decision-making. In the case of the moderation API and others, the API might give access to services other than the AI model. For example, the moderation API might be an interface to moderation system 136, addressed below.

Some other common APIs include the Fine-Tuning API, which allows developers to customize AI model(s) 110 of generative response engine 140 using their own datasets; the Audio and Speech APIs, which cause AI model(s) 110 to output speech or audio; and the Image Generation API, which causes AI model(s) 110 to output images (which might require utilizing other models).

There can also be APIs that direct AI model(s) 110 and/or generative response engine 140 to interface with other applications or other generative AI engines. In such cases, the specific application or AI engine might be specified, or AI model(s) 110 might be allowed to choose another application of generative response engine 140 to use in response to a prompt.

As described herein, a Responses API can be an improved API for interacting with AI model(s) 110. Responses API can take as a parameter a response ID, which can be used to return AI model(s) 110 to a state that the model was in at a particular response, thereby allowing a user account or developer to recall a previous context without having to re-prompt AI model(s) 110 or having to replicate a previous series of prompts. Further, Responses API can facilitate function chaining to enable execution of operations requiring several function calls without the added overheard of explicitly calling each required function.

In short, graphical user interface 104 and APIs 106 can be used to provide prompts to AI model(s) 110 of generative response engine 140. Prompts are sometimes differentiated into prompt types. For example, a system prompt can be a hidden prompt that sets the behavior and guidelines for the generative response engine. A user prompt is the explicit input provided by the user, which may include questions, commands, or information.

Generative response engine 140 may also include a context management service 120. The function of context management service 120 is to manage and organize the flow of data among key subsystems, enabling AI model(s) 110 to generate responses that are contextually relevant, accurate, and enriched with additional information as required.

Action 122 facilitates auxiliary tasks that extend beyond basic text generation. In some aspects, action 122 can be actions that correspond to an API 106. In some aspects, action 122 can be agentic actions that AI model(s) 110 decide to take to carry out a user's intent as described in the prompt. For example, an action can be to call tool 130 or even other AI model(s) 110. Tools 130 can include internet browsers, editors such as code editors, other AI tools, etc. While tools are shown outside of generative response engine

140, some tools might be part of generative response engine 140 and some tools might be external tools.

Prompt 124 is the request or command provided by the user account through front end 102. In some aspects, prompt 124 can be further supplemented by a system prompt and other information that might be included by graphical user interface 104 or API 106 or associated with a custom AI model. In some aspects, prompt 124 can be modified or enhanced by AI model(s) 110 as addressed further below. Additionally, as the user account provides prompts and AI model(s) 110 provide responses, a conversation thread forms. As the user account provides a new prompt, this is appended to the overall conversation and added to prompt 124. Thus, a user account might think of a first user-provided message as a first prompt and a second user-provided message as a second prompt, and so on, but prompt 124 as perceived by AI model(s) 110 can include a thread of user-provided messages and responses from AI model(s) 110 in a multi-turn conversation. The actors in the conversation thread can be labeled so that AI model(s) 110 can review the turns of the conversation. Generally, prompt 124 will include an entire conversation thread, but in some instances, prompt 124 might need to be shortened if it exceeds a maximum accepted length (generally measured by a number of tokens).

In some examples, context management service 120 can also route prompts and response through moderation system 136. In some aspects, prompts are provided to prompt safety system 132 before being provided to AI model(s) 110. Prompt safety system 132 is configured to use one or more techniques to evaluate prompts to ensure a prompt is not requesting AI model(s) 110 to generate moderated content. In some aspects, prompt safety system 132 can utilize text pattern matching, classifiers, and/or other AI techniques.

Since prompts can evolve over time through the course of a conversation, consisting of prompts and responses, prompts can be repeatedly evaluated at each turn in the conversation.

Personalization state 126 can facilitate continuity and personalization in conversations. It allows the system to maintain user-specific context, preferences, or details that may inform future interactions. Personalization state 126 can include a memory file of persisted data from previous interactions or sessions that provide background information to maintain continuity. In some aspects, information can be recorded to personalization state 126 at the instruction of AI model(s) 110 when AI model(s) 110 identify a fact or data that it determines should be saved in memory because the fact and/or data might be useful in later conversations or sessions. In some aspects, personalization state 126 can also include synthesized concepts extracted from past conversation threads, and personalization state 126 can also encompass the ability of AI model(s) 110 to search through past interactions to find relevant information to a current conversation thread.

Conversation metadata 128 can aggregate data points relevant to the conversation, including user prompt 124, action 122, and personalization state 126. This consolidated information package serves as the input for AI model(s) 110. Conversation metadata 128 can label parts of a prompt as user-provided, AI model-provided, a system prompt, personalization state 126, data from action 122 or tool 130 (addressed below).

AI model(s) 110 are the core engines that process inputs (from context management service 120) and generate outputs. In some aspects, AI model(s) 110 may be a generative transformer, or autoregressive transformer, but could use other architectures. In some examples, the transformer is multi-modal transformer that can use audio tokens (or embeddings thereof), visual tokens (or embeddings thereof), and language (or embeddings thereof) as needed.

A core feature of AI model(s) 110 is to generate content in response to prompts. The prompt can be from client application 138 provided via graphical user interface 104. AI model(s) 110 can be configured to receive inputs via APIs 106 that provide guidance on a desired output. AI model(s) 110 can analyze the input and identify relevant patterns and associations in the data, and generate a sequence of tokens that are predicted as the most likely continuation of the input. AI model(s) 110 generate responses by sampling from the probability distribution of possible tokens, guided by the patterns observed during its training. Two features of the autoregressive transformer that result in this functionality are that the autoregressive transformer might use only the decoder part of the transformer architecture and that it utilizes self-attention. By using the decoder part of the transformer architecture, the transformer focuses on predicting the tokens given the previous context tokens. And the self-attention mechanism captures long-range dependencies amongst tokens, allowing it to generate contextually relevant responses (in text, audio, images, and video).

In some aspects, AI model(s) 110 can generate multiple possible responses before presenting the final one. AI model(s) 110 can generate multiple responses based on the input, and these responses are variations that AI model(s) 110 consider potentially relevant and coherent.

In some aspects, AI model(s) 110 can evaluate generated responses based on certain criteria. These criteria can include relevance to the prompt, coherence, fluency, and sometimes adherence to specific guidelines or rules, depending on the application. Based on this evaluation, AI model(s) 110 can select the most appropriate response. This selection is typically the one that scores highest on the set criteria, balancing factors like relevance, informativeness, coherence, and content moderation instructions/training.

In some aspects, an instruction provided by an API 106, a system prompt, or a decision made by AI model(s) 110 can cause AI model(s) 110 to interpret a prompt and re-write it or improve the prompt for a desired purpose. For example, AI model(s) 110 can determine to take a prompt to make a picture and enhance the prompt to yield a better picture. In these instances, AI model(s) 110 can generate their own prompts, which can be provided to tool 130 or provided to AI model(s) 110 to yield a better output response than the original prompt might have.

AI model(s) 110 can also do more than generate content in response to a prompt. In some aspects, AI model(s) 110 can use decision boundaries to determine the appropriate course of action based on the prompt. In some examples, a decision boundary might be used to cause the AI model to recognize that it is being asked to provide a response in a particular format such that the AI model will generate its response constrained by the particular format. In some examples, a decision boundary can cause the model to refuse to generate a responsive output if the decision is that the responsive output would violate a moderation policy. In some examples, the decision boundary might cause the AI model to recognize that it needs to interface with another AI model or application to respond to the prompt. For example, when the AI model is a language model, it might recognize that it is being asked to output an image, and therefore, it needs to interface with a model that can output images to provide a response to the prompt. In another example, the prompt might request a search of the Internet before responding. The AI model can use a decision boundary to recognize that it should conduct a search of the Internet and use the results of that search in responding to the prompt. In another example, the prompt might request that the AI model take an agentic action on behalf of the user by interacting with a third-party service (e.g., book a reservation for me at . . . ), and the AI model can use a decision boundary to recognize that it needs to plan steps to locate the third-party service, contact the third-party service, and interact with the third-party service to complete the task and then report back to the user that the action has been completed.

When AI model(s) 110 determine to take an agentic action on behalf of the user or to call a tool to aid in providing a quality response to the user account, AI model(s) 110 might call a tool 130 or cause an action 122 to be performed. As indicated above, tools 130 can include internet browsers, editors such as code editors, other AI tools etc. Actions 122 are actions that AI model(s) 110 can cause to be performed, perhaps using tool 130. As used herein actions 122 should be considered to cover a broad array of actions that AI model(s) 110 can perform with or without tools 130. Tools 130 are considered to cover a wide variety of services and software that encompass tools such as a computer operating system such that AI model(s) 110 can control the computer operating system on the user's behalf, to robotic actuators, to search browsers and specific applications.

Additionally, AI model(s) 110 can also generate portions of responses that are not displayed to the user. For example, AI model(s) 110 can direct front end 102 to provide specific behaviors, such as directions for how to present the response from AI model(s) 110 to the user account. In another example, AI model(s) 110 can provide response portions dictated by APIs 106, where portions of the response to the API might be for the consumption of the calling application but not for presentation to the end user. In another example, some AI model(s) 110 are reasoning models, which are AI model(s) 110 that are configured to output a raw chain-of-thought before preparing a final response to a prompt. The raw chain-of-thought might not be presented to a user account or application calling an API. Instead, another AI model might summarize the raw chain-of-thought into a more consumable and useful output for the user account or application.

In some aspects, the output of the AI model can be further analyzed by output safety system 134. While AI model(s) 110 can perform some of their own moderation, there can be instances where it is beneficial to have another service review outputs for compliance with a moderation policy. The use of dashed lines in FIG. 1 differentiates a path using output safety system 134 and not using output safety system 134.

While FIG. 1 shows responses being provided back to front end 102 directly, in some aspects, the responses might be returned by way of context management service 120 via APIs 106.

Figure 2:
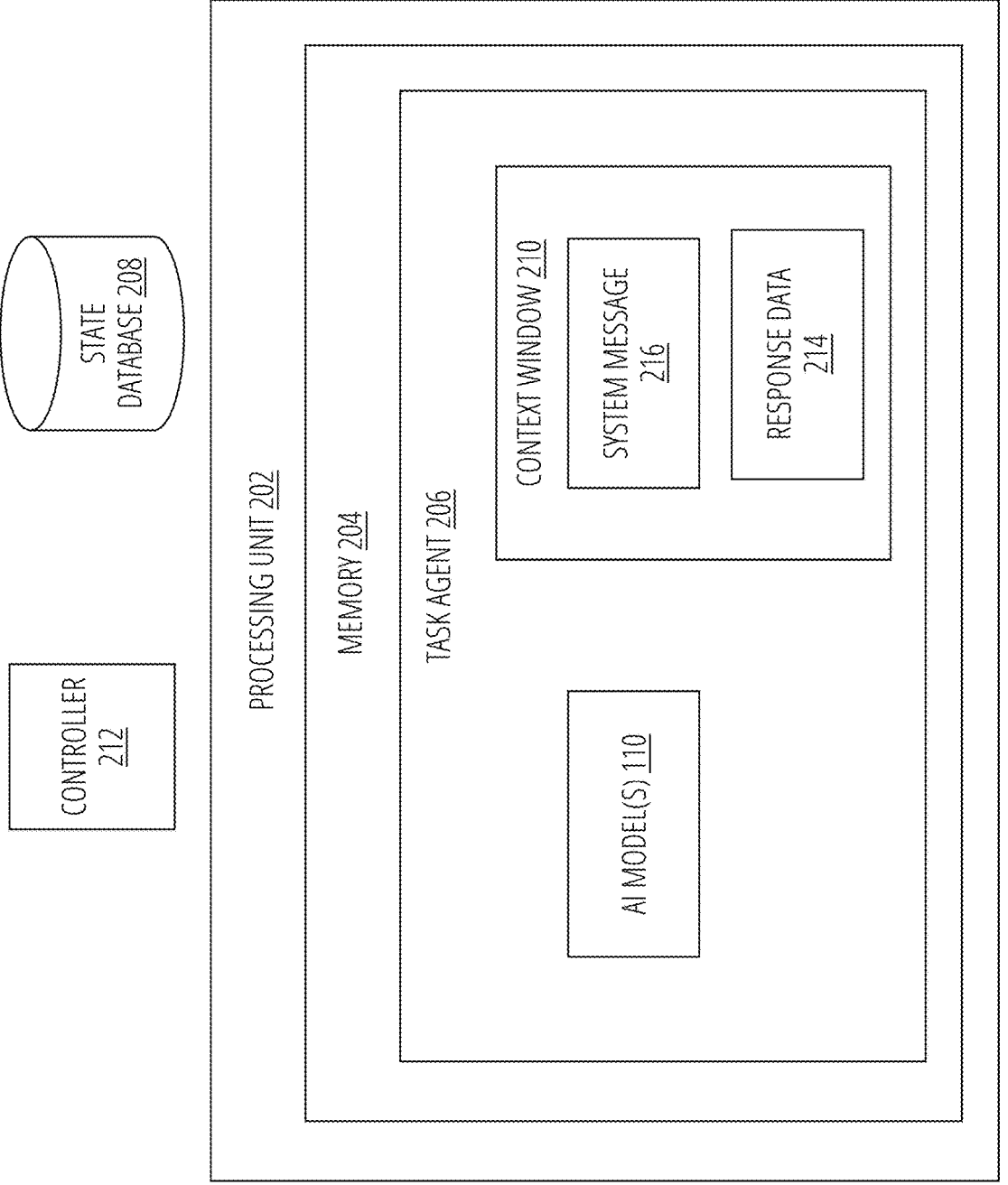
FIG. 2 illustrates an example system for generating output from an AI model given a context in accordance with some aspects of the present technology.

FIG. 2 illustrates components within a data center in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, some components can be divided into separate components, some components might not be present or needed, and additional components may be present.

While the components in FIG. 2 are all illustrated as being in data center 200, it is not required that all components be located in data center 200. Data center 200 should not be limited to a single data center. Instead, the component could be part of a hyperscaler running a public cloud that has many data centers. Data center 200 could be a single computing device or a network of computing devices. Data center 200 may include a processing unit 202 with a task agent 206 loaded into memory 204.

Task agent 206 may include AI model(s) 110, where AI model(s) 110 are configured with specific instructions that are included in system message 216. These instructions may modify and/or override a default system message that is generally used with AI model(s) 110. Task agent 206 can be an instance of AI model(s) 110 for completing one or more tasks received from a user account in a prompt. In some examples, task agent 206 can receive prompts from client application 138 at controller 212 via API 106. In addition to a prompt, an API call can include a response ID parameter. A response ID can map to a particular response in a tree of responses stored in state database 208. Accordingly, the response ID can be used (e.g., by task agent 206 or AI model(s) 110) to retrieve the particular response and any preceding responses (i.e., a chain of responses) in the response tree from state database 208. The chain of responses including the response associated with the response ID and any preceding responses can be included as response data 214 in context window 210 (e.g., with system message 216) such that AI model(s) 110 can be returned to a state associated with the response.

In some examples, context window 210 can pass AI model(s) 110 context from past interactions. In some examples, context can include the particular response associated with the response ID and any preceding responses, and/or any additional response metadata stored by state database 208. In some examples, a tree of responses can be any size and a chain of responses can be any length. However, since context window 210 for AI model(s) 110 might be limited to a maximum number of tokens while a conversation could be longer, the retrieved portion of the tree (e.g., chain of responses including the response associated with the response ID and any preceding responses) can be compressed prior to providing the chain of responses as response data 214. In some examples, based on the size of the chain of responses exceeding the size accepted by context window 210, AI model(s) 110 can be used to generate a summary or shortened version of the chain of responses.

State database 208 may be configured to store one or more trees of responses. Rather than storing a full conversation thread, which includes both prompts and responses, state database 208 can store a tree of responses, which may or may not include additional response metadata associated with each response in the tree. Each response may be associated with a response ID, such that, by passing a response ID as a parameter in an API, client application 138 can replicate the state of AI model(s) 110 at the time of the response associated with the response ID.

Figure 3B:
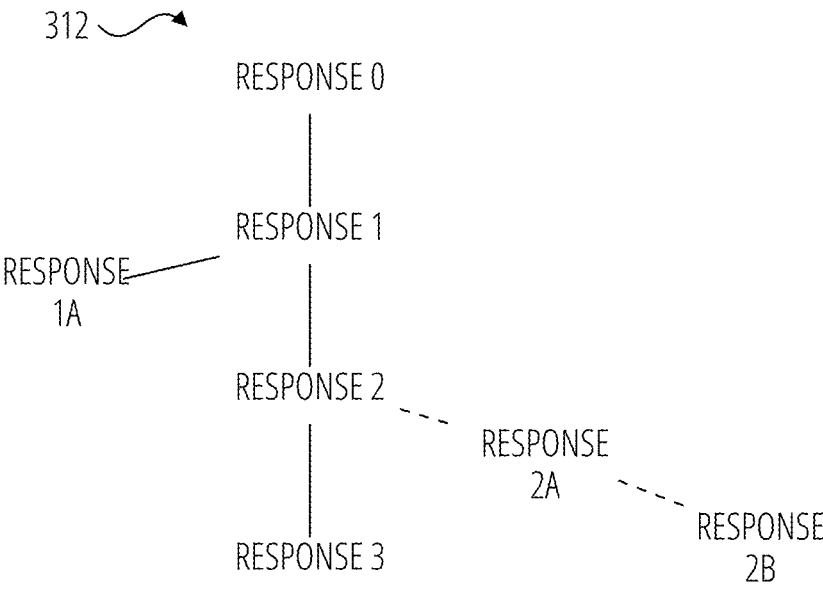
FIG. 3B illustrates an example chain of responses in accordance with some aspects of the present technology.

FIG. 3A illustrates an example process 300 for using, by an AI model, a response ID to return the AI model to a previous state, in accordance with some aspects of the present disclosure. FIG. 3A will be discussed in the context of FIG. 3B, which illustrates an example tree of responses 312.

FIG. 3B illustrates a tree of responses 312 including Responses 0, 1, 2, and 3. Responses 0, 1, 2, and 3 may be responses output by AI model(s) 110 as part of an interaction with a user account. For example, in addition to or instead of storing a conversation thread, state database 208 may maintain trees of responses generated from interactions between AI model(s) 110 and a user account. The trees of responses can, in some examples, store contexts or metadata associated with each response, and can be used to return AI model(s) 110 to a state of AI model(s) 110 at the time of a particular response. Responses in tree of responses 312 can have a respective response ID, such that state database 208 can be queried to retrieve a particular response in tree of responses 312 and any preceding responses in a chain of responses starting from the response associated with the response ID and working backwards up the tree. Accordingly, a response ID can be used to easily return AI model(s) 110 to its state at the time of a particular response without having to recreate the conversation leading to the response.

As an example, a user account may prompt generative response engine 140 to plan travel to a destination meeting certain categories, yielding Response 0. The user account may provide additional prompts, yielding Responses 1 and 2 further outputting destination suggestions. User account may then prompt generative response engine 140 by indicating a destination preference, resulting in generative response engine 140 outputting Response 3, which includes information on a particular destination. The user account can decide to pursue information on a different destination (e.g., one of a number of destinations presented as output in Response 2). Accordingly, the user account can use 2 (e.g., the response ID of Response 2) to return AI model(s) 110 to its state at the output of Response 2. This can, for example, prevent state drift, such that Response 3 is conflated as context for subsequent responses by AI model(s) 110.

Returning to FIG. 3A, at block 302, AI model may receive a response ID via an API (e.g., API 106, which may be a Responses API). The response ID can be a number or other identifier for identifying a particular response in a particular tree of responses. In some examples, the response ID may also include a portion identifying the tree of responses containing the particular response ID. In some examples, the particular response and previous responses can be a state representation of a context of AI model(s) 110. In some examples, a state representation can include metadata associated with a response of the AI model, where the metadata includes one or more function calls of the AI model used in outputting the response (e.g., for function chaining).

At block 304, generative response engine 140 (e.g., context management service 120 or AI model(s) 110) may query state database 208 using the response ID to retrieve a chain of responses including the response associated with the response ID and any preceding responses in the tree. For example, given tree of responses 312, a user account can pass a response ID=2 to generative response engine 140 via API 106. Generative response engine 140 may retrieve Response 2 and preceding responses, Response 0 and Response 1 from tree of responses 312 (e.g., a chain of responses including Responses 0, 1, and 2). In some examples, when retrieving the response associated with the response ID and any preceding responses, generative response engine 140 retrieves responses directly chained to the response associated with the response ID. For example, generative response engine 140 may retrieve Responses 0, 1, and 2, but not Response 1A, which branches from Response 1.

As a more detailed example, let the most recent response output by AI model(s) 110 be Response 3. The user may decide they are unhappy with Response 3 as output and wish to backtrack up the tree of responses to return AI model(s)

110 to its state before being prompted to provide Response 3. The user can easily return AI model(s) 110 to this state by passing API 106 the response ID for Response 2. Accordingly, the response ID can easily allow a user to revert a state of AI model(s) 110 to a previous state.

At block 306, the retrieved response and preceding responses (e.g., Response 2, and Responses 0 and 1) can be provided to AI model(s) 110 via context window 210 as response data 214. In some examples, context window 210 can include other context items, such as a system message 216 and/or personalization state associated with a user account. By providing response data 214 to AI model(s) 110, AI model(s) 110 can have context of the previous responses in the tree such that it can return to a state associated with the particular response associated with the response ID.

At block 308, AI model(s) 110 can output a response based, at least in part, on the particular response (e.g., Response 2—the response associated with the response ID) and any responses preceding the particular response in the tree of responses 312 (e.g., Response 0 and Response 1).

At block 310, generative response engine 140 can update tree of responses 312 by appending the output response (e.g., Response 2A) to tree of responses 312 branching from Response 2 (e.g., the particular response associated with the response ID). Any subsequent responses in this particular conversation thread (e.g., Response 2B) can continue to be appended to the branch stemming from Response 2. In some examples, generative response engine 140 can generate a current state representation of a current state of AI model(s) 110. The current state representation can be associated with a current response ID (e.g., associated with Response 2A). The current state representation can be appended to the tree of responses stored in state database 208.

Accordingly, API 106 can accept a response ID parameter such that generative response engine 140 can be used to leverage responses, and response metadata, stored in state database 208. For example, a response ID can be passed to generative response engine 140 via API 106 to effectively backtrack up a tree of responses generated from interactions with generative response engine 140 by a user account, thereby returning AI model(s) 110 to a state associated with a previous response and/or previous responses. Thus, API 106 can provide developers with flexibility to recall previous states of AI model(s) 110 and to manage states through the tree of responses stored in state database 208.

Figure 4:
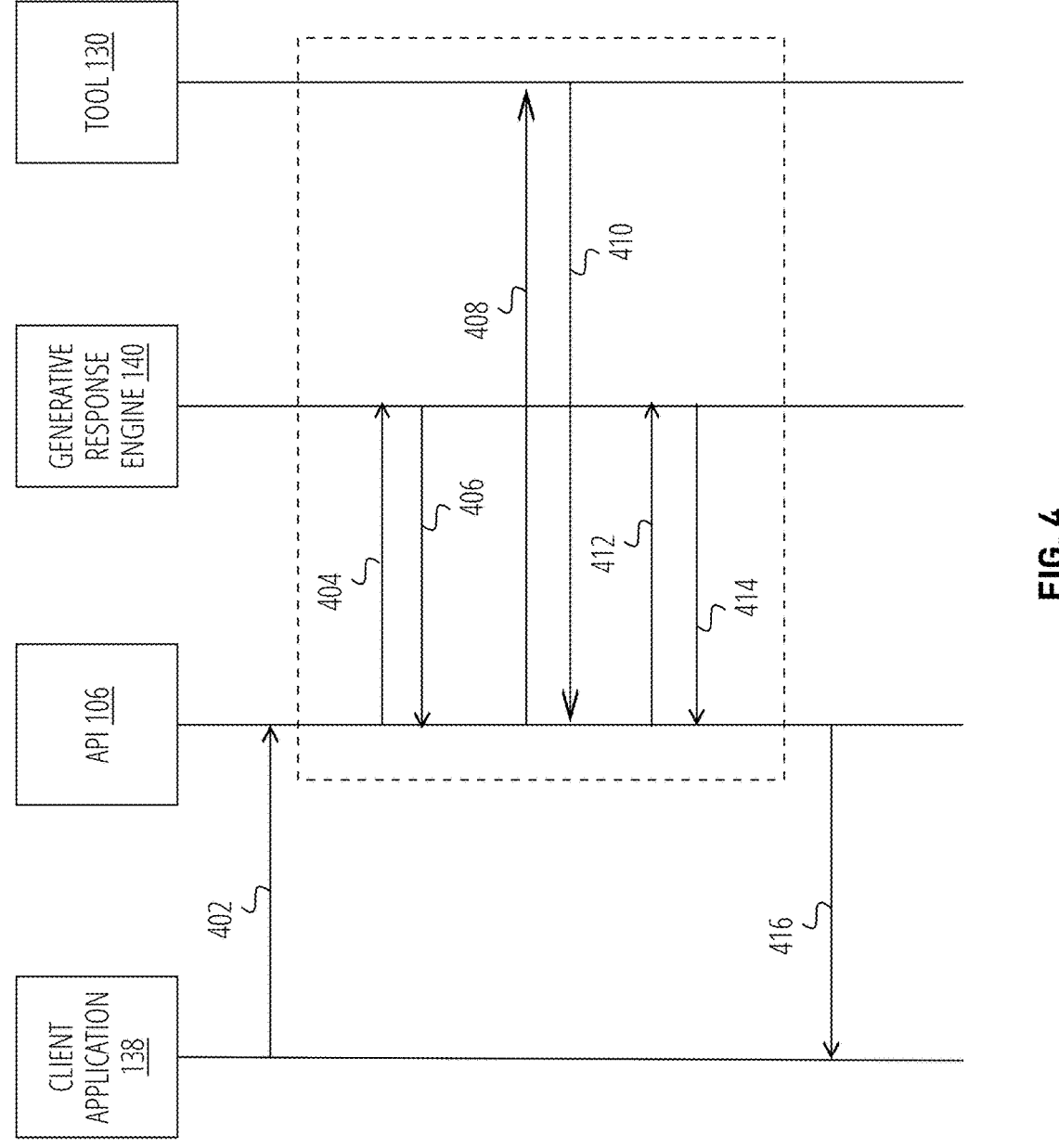
FIG. 4 illustrates an example process for implementing function chaining in accordance with some aspects of the present technology.

FIG. 4 is a diagram illustrating an example process 400 for function chaining using API 106, in accordance with some aspects of the present disclosure.

The present technology also facilitates agentic looping and function chaining to streamline and reduce the number of API calls needed to complete a task using an AI model of the generative response engine. In this regard the present technology addresses at least two problems that LLMs commonly face. First, the outputs of the generative response engine are probabilistic, which means, that it is not generally possible to be assured of a particular output. Therefore, even when a tool call is explicitly requested in a prompt, an API caller cannot be sure that that the generative response engine will call the tool. The present technology addresses this problem by including a parameter in the API for a predefined tool that can result in constrained sampling by the AI model to force the AI model to output a tool call to the tool associated with the predefined tool indicated in the API call. Additionally, the present technology makes tool calling easier. Generally, after a tool call, the API caller would need to receive the result of the tool call and provide that into the context window of the generative response engine. This can be inefficient, especially when multiple tool calls are made to eventually perform a single task. The present technology solves this problem by enabling the AI model to call tools, receive tool call responses directly, and make additional tool calls until the AI model outputs an end turn token as part of a response. Upon receipt of the end turn token, the API can provide the response to the application. Thus, the API does not need continually prompt the AI model to output tool calls and does not provide a response until the function of the predefined tool is completed as determined by the AI model. For example, developers can use the disclosed API to call tools in a single flow rather than using separate APIs for different tools or modalities. The generative response engine is able to decide to call multiple tools, and decide an order in which to call those tools, and utilize the outputs of multiple tool calls to provide a response to a single API call.

Function chaining can allow performance, by generative response engine 140, of a sequence of functions or tool calls, thereby the generative response engine 140 can perform a complex task that might normally require multiple turns that involve the application or user. Function chaining streamlines programming required by software developers by obviating the need to hardcode prompts or sequences of prompt to cause generative response engine 140 to execute individual tool calls to complete a complex task that might require multiple operations.

Step 402 may include invoking, by client application 138, API 106. Client application 138 may, for example, receive a prompt from a user where the prompt includes instructions for generative response engine 140 to perform an operation or task requiring several tools, or the client application 138 might include an instruction to prompt the generative response engine 140.

In some examples, the AI model has several tool primitives that the model can call as part of its inference process. A primitive can refer to a low-level operation that can be available to build higher-level functionality. When a tool is considered a primitive for a model, it means the model treats it as a basic, native operation that the AI model can use fluidly. Thus, instead of trying to complete a task based on its training data, the AI model can invoke a tool primitive, meaning the AI model can simply use the tool at inference time. In other words, the AI model knows when to use a tool primitive (based on context) and knows how to use the tool primitive (i.e., the AI model can call it with proper syntax or structure).

Step 404 may include passing the prompt and instruction to perform an operation to generative response engine 140. In some examples, the instruction can include a command to enforce constrained sampling by AI model(s) 110 such that AI model(s) 110 outputs a tool call to a tool needed to complete the task or operation. For example, constrained sampling can limit the output of AI model(s) 110 to be sampled from a particular set of tokens or to conform output to a particular structure, where the set of tokens are associated with tool calls to available tools.

Step 406 may include passing the output (e.g., the output including a tool call) to API 106. In some examples, the tool call or an instruction to call a tool can be included in the header of the output.

At step 408, API 106 can execute the tool call to tool 130 to invoke tool 130 to execute an operation.

At step 410, API 106 can receive output from tool 130 upon completion of the operation in furtherance of the task requested in the prompt.

At step 412, API 106 can provide, to generative response engine 140, the output received from tool 130 in response to calling the tool to execute the operation or task.

At step 414, generative response engine 140, can reason over whether the requested task has been completed based on the received output from tool 130. If the task is complete, generative response engine 140 may output a response including an end turn token. For example, generative response engine 140 can continue to output tool calls to API 106 and receiving the tool output or results of calling tool 130 any number of times (e.g., by repeating steps 404 through 414 until generative response engine 140 determines that the task is complete. This determination is signaled by the output of an end turn token or stop token by generative response engine 140. Step 414 can further include providing the output, including the end turn token, to API 106.

As an example, AI model(s) 110 can reason over whether an additional tool is needed to complete the task associated with the original prompt received at step 404. For example, AI model(s) 110 can be trained on when a task or set of tasks is complete, or on what tool calls or steps are needed before a task is complete. In some examples, AI model(s) 110 can cross a decision boundary indicating when to output the end turn token.

Step 416 can include transmitting, from API 106 to client application 138, the response from generative response engine 140 based on the receipt of the end turn token. The end turn token can signal, to API 106, that the operation has been completed. In some examples, the response including the end turn token includes a response portion to be provided to a user account via an interface of a device executing client application 138.

Process 400 can facilitate agentic looping such that API 106 and generative response engine 140 can loop through turns thereby continually outputting tool calls useable by API 106 to call tool 130 (or other first- or third-party tools) to complete the task. API 106 can inquire, to AI model(s) 110, whether the task is complete or can include deterministic code to identify whether an end turn token has been received. AI model(s) 110 can reason over whether the most recent output resulted in completion of the task and, if so, can return an end turn token to signal to API 106 that AI model(s) 110 is finished with the requested task. Thus, AI model(s) 110 can iteratively output tool calls in furtherance of a task without requiring hardcoding or limiting the AI model(s) 110 to a set number of turns.

Further, function chaining through API 106 can simplify completion of operations requiring multiple tool calls, by removing the need to hardcode multiple API calls to call each tool needed to complete an operation.

For example, client application 138 can pass API 106 an operation name, where the operation is associated with a set of tools or functions available to AI model(s) 110. As one example, an operation could be a file search, where, in order to execute the file search, the user account has to instruct AI model(s) 110 to call a series of tools or functions which can include "open ( )" "read ( )" "for line in file:," "research ( )" and so on. Ordinarily, each tool call has to be individually programmed by a developer. However, the present technology obviates the need to repeatedly make function calls to perform an operation by enabling function chaining.

Figure 5:
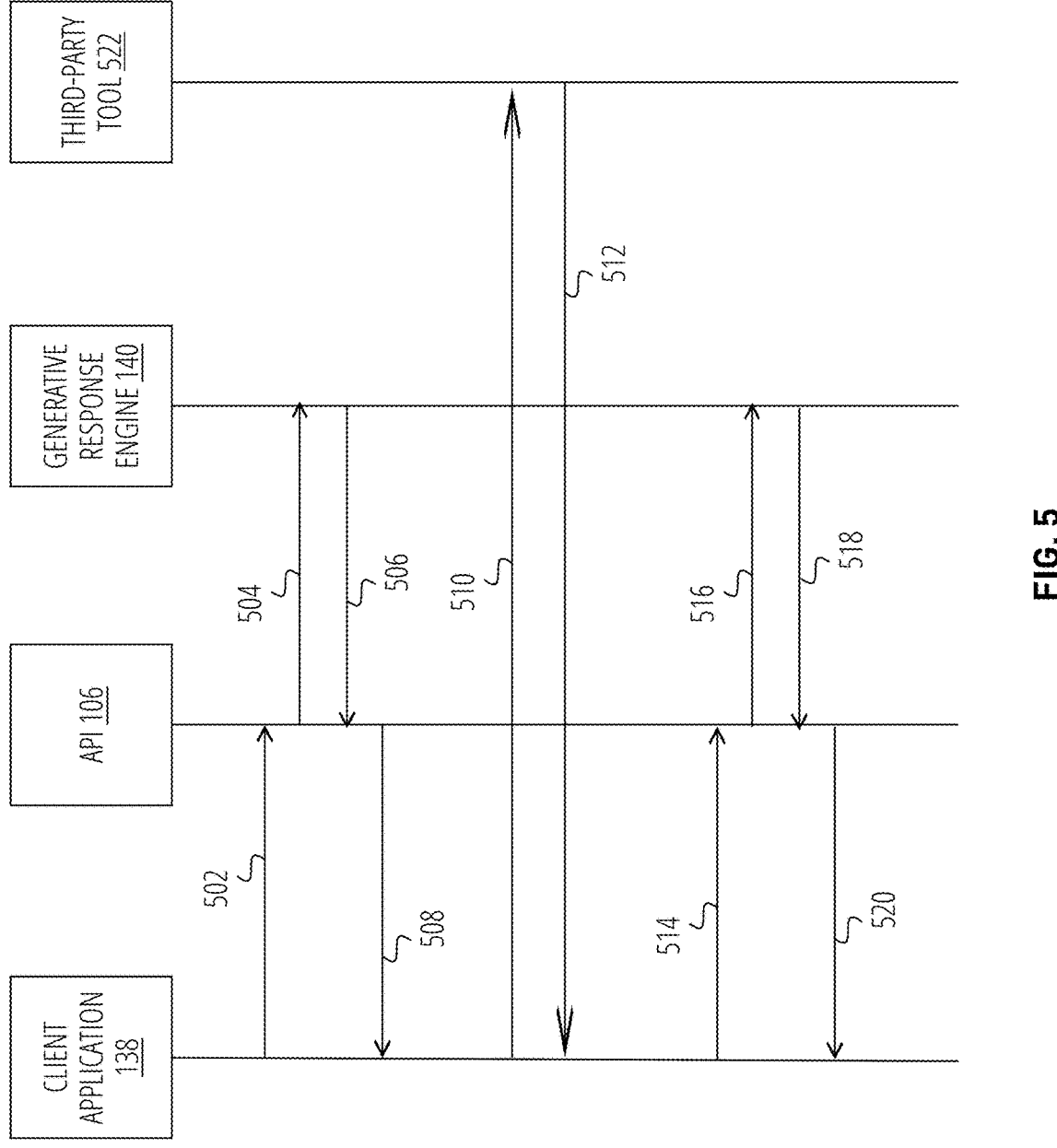
FIG. 5 illustrates another example process for implementing function chaining in accordance with some aspects of the present technology.

FIG. 5 is a diagram illustrating another example process 500 for function chaining using API 106, in accordance with some aspects of the present disclosure.

Step 502 may include invoking, by client application 138, API 106. Client application 138 may, for example, receive a prompt from a user where the prompt includes instructions for generative response engine 140 to perform an operation or task requiring several tools, or the client application 138 might include an instruction to prompt the generative response engine 140.

At step 504, API 106 may pass the prompt and any additional context (e.g., information about third-party tool 522) to generative response engine 140. Information about third-party tool 522 can include code and information such as required parameters and syntax for a tool call to third-party tool 522.

At step 506, generative response engine 140 may output, to API 106, a tool call useable to invoke third-party tool 522.

At step 508, API 106 can provide, to client application 138, the tool call.

At step 510, client application 138 can use the tool call output by generative response engine 140 to invoke or call third-party tool 522 to complete a portion of the task requested by the user account.

At step 512, third-party tool 522 may output a response or other information to client application 138 from which the remote tool (e.g., third-party tool 522) was called.

At step 514, client application 138 can provide the response or result of invoking third-party tool 522 to API 106.

At step 516, API 106 can provide the response or results of calling third-party tool 522 to generative response engine 140 as context.

At step 518, generative response engine 140 may reason over whether the requested task is complete based on the result of invoking third-party tool 522 and based on any other context received in its context window. If AI model(s) 110 determines that the task is complete, it can output an end turn token to API 106. In another example, AI model(s) 110 may output a tool call to third-party tool 522 or another first- or third-party tool in furtherance of the task.

At step 520, if API 106 receives an end turn token from generative response engine 140, it can output the end response from generative response engine 140 to client application 138. If the output of AI model(s) 110 at step 518 was a tool call (e.g., to third-party tool 522 or another third-party tool), API 106 can provide the tool call to client application 138, thereby initiating process 500 to repeat from step 510.

Although described separately, steps of process 400, illustrated in FIG. 4, and steps of process 500, illustrated in FIG. 5, can occur together. For example, generative response engine 140 can output any order or combination of first- and third-party tool calls in furtherance of a task, and can loop through tool calls any number of times until the task is complete.

FIG. 6 illustrates an example method 600 for a method for using a response ID to dictate a state of the generative response engine in accordance with some aspects of the present technology. Although example method 600 depicts a particular sequence of operations, the sequence may be altered without departing from the scope of the present disclosure. For example, some of the operations depicted may be performed in parallel or in a different sequence that does not materially affect the function of method 600. In other examples, different components of an example device or system that implements method 600 may perform functions at substantially the same time or in a specific sequence.

In block 602, method 600 includes receiving, from a client application via an application programming interface (API), a request comprising a prompt for an artificial intelligence (AI) model of a generative response engine and a response ID. The response ID can be an ID provided by the AI model in a previous response that identifies the previous response. For example, generative response engine 140 can receive a prompt from client application 138 via API 106, which may include a response ID passed as a parameter to API 106. In some examples, responses returned from AI model(s) 110 are labeled with response IDs and a collection of response IDs can be organized into a tree. The response ID may be for any previous response and does not need to be for a response that immediately precedes the prompt.

In some examples, generative response engine 140 may query state database 208 using the response ID to identify a tree of responses and to retrieve the chain of responses (which may be a subset of the responses in the tree of responses) ending at the response associated with the response ID and including preceding responses in the tree of responses. Generative response engine 140 can populate the context window with the retrieved chain of responses and pass the context window and prompt to AI model(s) 110.

In some examples, the AI model is a multi-modal transformer model. In some examples, the AI model has at least 1 billion parameters. In some examples, the AI model is a transformer-based language model adapted to accept text, audio, and vision inputs. In some examples, the AI model is a distilled version of a larger model having at least 1 billion parameters.

In block 604, method 600 includes retrieving, by the generative response engine from a database, a chain of responses from a tree of responses, where the chain of responses includes responses in a sequence that ends with the response having the response ID, where the chain of responses constitutes a state representation. A state representation can be, in some examples, a previous context of the AI model associated with a response output by the AI model.

For example, generative response engine 140 (or a component of generative response engine 140 such as context management service 120 or AI model(s) 110) can query state database 208 using the response ID received via API 106. The query may return the response associated with the response ID, as well as any previous responses in the response tree. The response and previous responses may constitute a state representation, or a representation of a state of AI model(s) 110.

In block 606, method 600 includes passing, to the AI model, the prompt and the state representation. For example, generative response engine 140 can pass the state representation (e.g., the chain of responses including the response and previous responses) to AI model(s) 110. The chain of responses can be provided in context window 210 such that AI model(s) 110 can access the chain of responses. The output of AI model(s) 110 may be based, at least in part, on the state representation provided by the chain of responses.

In block 608, method 600 includes receiving, from the generative response engine, a response to the prompt and a second response ID corresponding to the response output by the AI model, where the response is based at least in part on the state representation. For example, AI model(s) 110 can output a response to the prompt, where the response is based at least in part on the context of the state representation (e.g., the particular response and previous responses. Framed another way, AI model(s) 110 can generate output to the prompt based on the context of the state representation, without the context of any intervening states or responses from the most recent response to the response following the response associated with the response ID.

FIG. 7 illustrates an example method 700 for a method for using an API to implement agentic looping with an AI model of a generative response engine in accordance with some aspects of the present technology. Although example method 700 depicts a particular sequence of operations, the sequence may be altered without departing from the scope of the present disclosure. For example, some of the operations depicted may be performed in parallel or in a different sequence that does not materially affect the function of method 700. In other examples, different components of an example device or system that implements method 700 may perform functions at substantially the same time or in a specific sequence.

In block 702, method 700 includes receiving, by a generative response engine from a client application via an application programming interface (API), a request to respond to a prompt using an artificial intelligence (AI) model of the generative response engine. For example, generative response engine 140 can receive a prompt from client application 138 via API 106. API 106 or an API service may allow multiple outputs, such that AI model(s) 110 can generate intermittent outputs not provided to client application 138. This can facilitate agentic looping by API 106 and generative response engine 140 in furtherance of a task defined by the prompt.

The prompt can define a task such that responding to the prompt would benefit from the AI model calling at least one tool or function. In some examples, the task can be an operation requiring sequential calls to several tools or functions to complete. In some examples, the tool invocation is integrated into the reasoning framework of the AI model and treated as a core computational capability available during runtime.

In some examples, the AI model is a multi-modal transformer model. In some examples, the AI model has at least 1 billion parameters. In some examples, the AI model is a transformer-based language model adapted to accept text, audio, and vision inputs. In some examples, the AI model is a distilled version of a larger model having at least 1 billion parameters.

In block 704, method 700 can include generating, by AI model of the generative response engine, a first output including a call to a first tool of the at least one tool. For example, AI model(s) 110 of generative response engine 140 can generate output based on the prompt. Based on the indication of the task in the prompt, or as a parameter of API 106, generative response engine 140 can enforce constrained sampling by AI model(s) 110 such that output of AI model(s) 110 is constrained to include a tool call to a tool associated with the task.

In some examples, the API can facilitate state management in the context of function chaining to enable complex operations that require several tools and recall to particular model states. For example, AI model(s) 110 can pass the response ID to a tool, where the tool is selected from a set of tools based on the prompt (or based on a task indicated in the prompt). The tool may use a chain of responses retrieved from a tree of responses based on the response ID to complete a task associated with the prompt or in furtherance of a task associated with the prompt.

In block 706, method 700 can include calling, by the API, the tool using the call output by the AI model. For example, AI model(s) 110 can output a tool call to API 106 that is useable by API 106 to call a first- or third-party tool (e.g., tool 130 or third-party tool 522).

In block 708, method 700 can include providing, to the AI model from the API, a result of calling the tool in block 708. For example, API 106 can receive a result of calling tool 130 or third-party tool 522. The result can be an indication of successful completion of a task or operation, or any other information output by the tool. API 106 can provide the result to AI model(s) 110 in its context window.

In block 710, method 700 can include generating, by the AI model, a second output that includes an end turn token. For example, AI model(s) 110 can generate the second output based, at least in part, on the result of calling the tool. In some examples, the output of AI model(s) 110 can indicate that the task has been completed based on AI model(s) 110 including, in its output, an end turn token. AI model(s) 110 can output first- and/or third-party tool calls any number of times and in any order or combination before outputting an end turn token to indicate that the task is complete.

The end turn token can be an important output to API 106 in determining whether to provide a response to client application 138. In particular, if AI model(s) 110 does not return an end turn token to API 106 in its response, API 106 can execute deterministic code to prompt AI model(s) 110 with a prompt inquiring whether AI model(s) 110 is done with the task (e.g., when a response can be output to client application 138). Based on the prompt, AI model(s) 110 may reason about the most recent step or turn completed by AI model(s) 110 to determine whether it can or should do more (e.g., execute an additional tool call) to provide a better or more complete response to client application 138. In some examples, this loop can give rise to AI model(s) 110 performing the agentic action to call new tools or keep working until the requested task is complete.

In block 712, method 700 can include providing, by the AI model, the second output to the client application via the API. For example, AI model(s) 110 (or generative response engine 140) can provide the second output to client application 138 via API 106 based on the inclusion, in the second output, of the end turn token. The end turn token can signal to API 106 that the requested task is complete and that API 106 can return the final response (e.g., the second output) to the client application 138.

Figure 8:
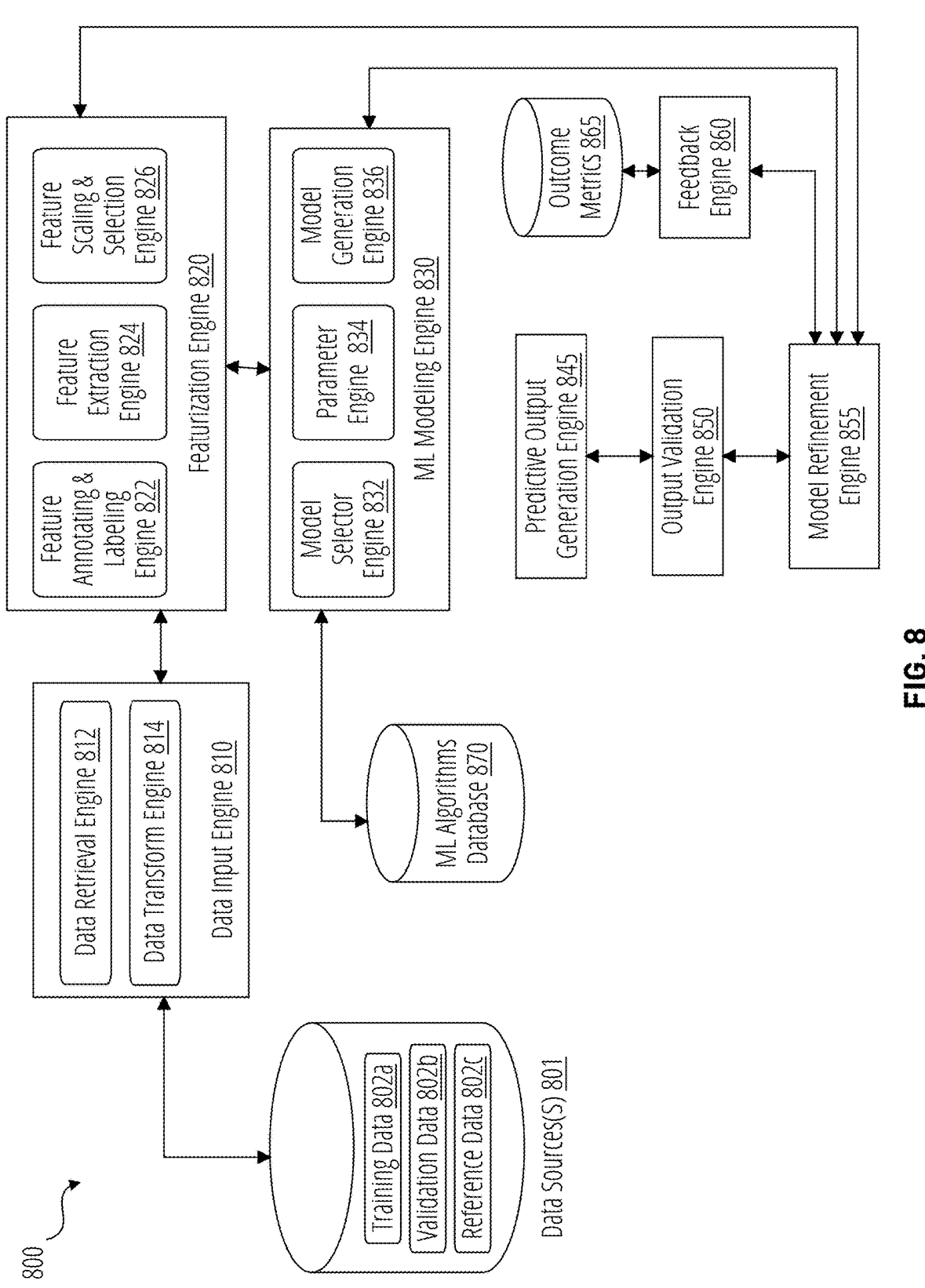
FIG. 8 is a block diagram illustrating an example machine-learning platform in accordance with some aspects of the present technology.

FIG. 8 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 800 may include data input engine 810 that can further include data retrieval engine 812 and data transform engine 814. Data retrieval engine 812 may be configured to access, interpret, request, or receive data, which may be adjusted, reformatted, or changed (e.g., to be interpretable by another engine, such as data input engine 810). For example, data retrieval engine 812 may request data from a remote source using an API. Data input engine 810 may be configured to access, interpret, request, format, re-format, or receive input data from data sources(s) 801. For example, data input engine 810 may be configured to use data transform engine 814 to execute a re-configuration or other change to data, such as a data dimension reduction. In some aspects, data sources(s) 801 may be associated with a single entity (e.g., organization) or with multiple entities. Data sources(s) 801 may include one or more of training data 802*a* (e.g., input data to feed a machine learning model as part of one or more training processes), validation data 802*b*

(e.g., data against which at least one processor may compare model output with, such as to determine model output quality), and/or reference data 802*c*. In some aspects, data input engine 810 can be implemented using at least one computing device. For example, data from data sources(s) 801 can be obtained through one or more I/O devices and/or network interfaces. Further, the data may be stored (e.g., during execution of one or more operations) in a suitable storage or system memory. Data input engine 810 may also be configured to interact with a data storage, which may be implemented on a computing device that stores data in storage or system memory.

System 800 may include featurization engine 820. Featurization engine 820 may include feature annotating & labeling engine 822 (e.g., configured to annotate or label features from a model or data, which may be extracted by feature extraction engine 824), feature extraction engine 824 (e.g., configured to extract one or more features from a model or data), and/or feature scaling & selection engine 826 Feature scaling & selection engine 826 may be configured to determine, select, limit, constrain, concatenate, or define features (e.g., AI features) for use with AI models.

System 800 may also include machine learning (ML) ML modeling engine 830, which may be configured to execute one or more operations on a machine learning model (e.g., model training, model re-configuration, model validation, model testing), such as those described in the processes described herein. For example, ML modeling engine 830 may execute an operation to train a machine learning model, such as adding, removing, or modifying a model parameter. Training of a machine learning model may be supervised, semi-supervised, or unsupervised. In some aspects, training of a machine learning model may include multiple epochs, or passes of data (e.g., training data 802*a*) through a machine learning model process (e.g., a training process). In some aspects, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed aspects in any way, a machine learning model may include millions, billions, or even trillions of model parameters. ML modeling engine 830 may include model selector engine 832 (e.g., configured to select a model from among a plurality of models, such as based on input data), parameter engine 834 (e.g., configured to add, remove, and/or change one or more parameters of a model), and/or model generation engine 836 (e.g., configured to generate one or more machine learning models, such as according to model input data, model output data, comparison data, and/or validation data).

In some aspects, model selector engine 832 may be configured to receive input and/or transmit output to ML algorithms database 870. Similarly, featurization engine 820 can utilize storage or system memory for storing data and can utilize one or more I/O devices or network interfaces for transmitting or receiving data. ML algorithms database 870 may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a diffusion model, a diffusion-transformer model, an encoder such as BERT (Bidirectional Encoder Representations from Transformers) or LXMERT (Learning Cross-Modality Encoder Representations from Transformers), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Some of the ML algorithms in ML algorithms database 870 can be considered generative response engines. Generative response engines are those models are commonly referred to as Generative AI, and that can receive an input prompt and generate additional content based on the prompt. GPTs, diffusion models, and diffusion-transformer models are some non-limiting examples of generative response engines. Some specific examples of generative response engines that can be stored in the ML algorithms database 870 include versions DALL.E, CHAT GPT, and SORA, all provided by OPEN AI.

System 800 can further include predictive output generation engine 845 and output validation engine 850 (e.g., configured to apply validation data to machine learning model output). Predictive output generation engine 845 can analyze the input and identify relevant patterns and associations in the data it has learned to generate a sequence of words that predictive output generation engine 845 predicts is the most likely continuation of the input using one or more models from the ML algorithms database 870, aiming to provide a coherent and contextually relevant answer. Predictive output generation engine 845 generates responses by sampling from the probability distribution of possible words and sequences, guided by the patterns observed during its training. In some aspects, predictive output generation engine 845 can generate multiple possible responses before presenting the final one. Predictive output generation engine 845 can generate multiple responses based on the input, and these responses are variations that predictive output generation engine 845 considers potentially relevant and coherent. Output validation engine 850 can evaluate these generated responses based on certain criteria. These criteria can include relevance to the prompt, coherence, fluency, and sometimes adherence to specific guidelines or rules, depending on the application. Based on this evaluation, output validation engine 850 selects the most appropriate response. This selection is typically the one that scores highest on the set criteria, balancing factors like relevance, informativeness, and coherence.

System 800 can further include feedback engine 860 (e.g., configured to apply feedback from a user and/or machine to a model) and model refinement engine 855 (e.g., configured to update or re-configure a model). In some aspects, feedback engine 860 may receive input and/or transmit output (e.g., output from a trained, partially trained, or untrained model) to outcome metrics database 865. Outcome metrics database 865 may be configured to store output from one or more models and may also be configured to associate output with one or more models. In some aspects, outcome metrics database 865, or other device (e.g., model refinement engine 855 or feedback engine 860), may be configured to correlate output, detect trends in output data, and/or infer a change to input or model parameters to cause a particular model output or type of model output. In some aspects, model refinement engine 855 may receive output from predictive output generation engine 845 or output validation engine 850. In some aspects, model refinement engine 855 may transmit the received output to featurization engine 820 or ML modeling engine 830 in one or more iterative cycles.

The engines of system 800 may be packaged functional hardware units designed for use with other components or a part of a program that performs a particular function (e.g., of related functions). Any or each of these modules may be implemented using a computing device. In some aspects, the functionality of system 800 may be split across multiple computing devices to allow for distributed processing of the data, which may improve output speed and reduce computational load on individual devices. In some aspects, system 800 may use load-balancing to maintain stable resource load (e.g., processing load, memory load, or bandwidth load) across multiple computing devices and to reduce the risk of a computing device or connection becoming overloaded. In these or other aspects, the different components may communicate over one or more I/O devices and/or network interfaces.

System 800 can be related to different domains or fields of use. Descriptions of aspects related to specific domains, such as natural language processing or language modeling, is not intended to limit the disclosed aspects to those specific domains, and aspects consistent with the present disclosure can apply to any domain that utilizes predictive modeling based on available data.

Figure 9A:
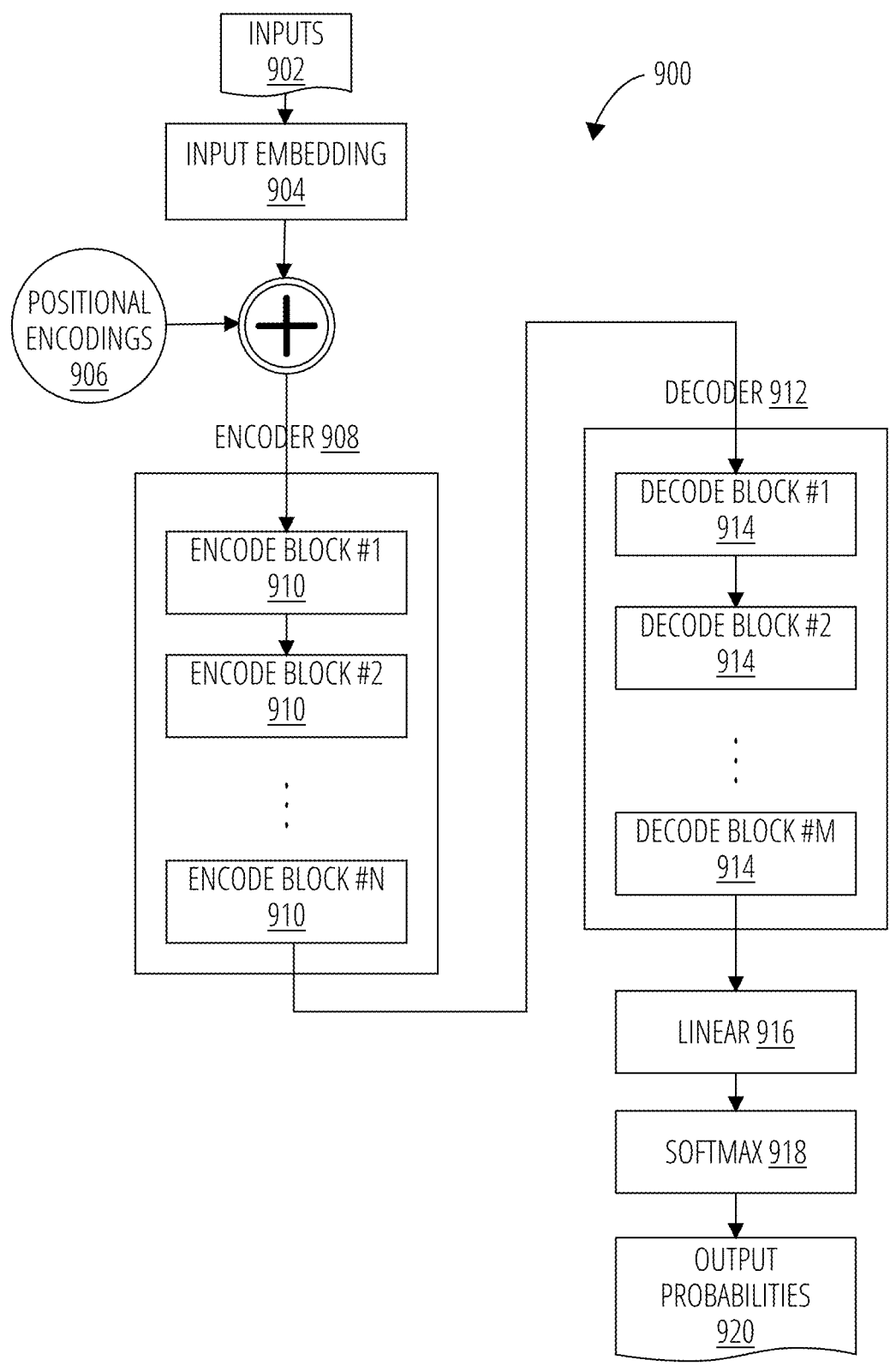
FIG. 9A, FIG. 9B, and FIG. 9C illustrate an example transformer architecture in accordance with some aspects of the present technology.
Figure 9B:
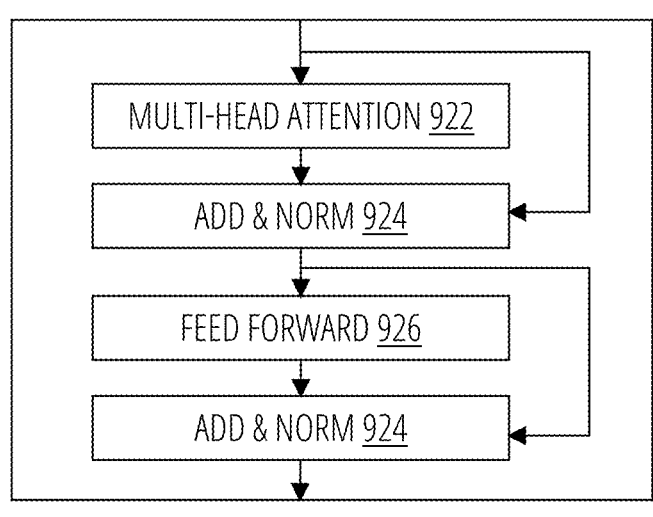
Figure 9C:
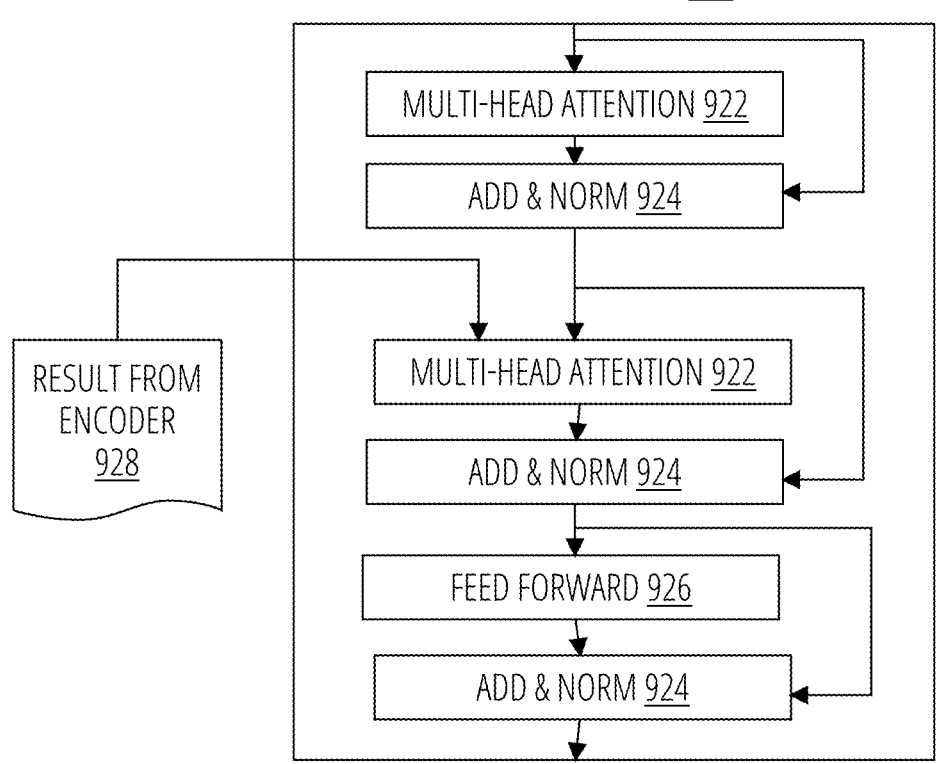

FIG. 9A, FIG. 9B, and FIG. 9C illustrates an example transformer architecture in accordance with some aspects of the present technology. Examples of ML models that use a transformer neural network (e.g., transformer architecture 900) can include, e.g., generative pretrained transformer (GPT) models and Bidirectional Encoder Representations from Transformer (BERT) models. The transformer architecture 900, which is illustrated in FIG. 9A, FIG. 9B, and FIG. 9C, includes inputs 902, input embedding block 904, positional encodings 906, encoder 908 including encode blocks 910, decoder 912 including decode blocks 914, linear block 916, softmax block 918, and output probabilities 920.

Input embedding block 904 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 904 can be learned embeddings to convert the input tokens and output tokens to vectors of dimension that have the same dimension as the positional encodings, for example.

Positional encodings 906 provide information about the relative or absolute position of the tokens in the sequence. According to certain non-limiting examples, positional encodings 906 can be provided by adding positional encodings to the input embeddings at the inputs to the encoder 908 and decoder 912. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Encoder 908 can use stacked self-attention and point-wise, fully connected layers. Encoder 908 can be a stack of N identical layers (e.g., N=6), and each layer can be an encode block, as illustrated by encode block 910 shown in FIG. 9B. Each encode block 910 has two sub-layers: (i) a first sub-layer has a multi-head attention block 922 and (ii) a second sub-layer has a feed forward block 926, which can be a position-wise fully connected feed-forward network. The feed forward block 926 can use a rectified linear unit (ReLU).

Encoder 908 uses a residual connection around each of the two sub-layers, followed by an add & norm block 924, which performs normalization. For example, the output of each sub-layer can be LayerNorm(x+Sublayer(x)). To facilitate these residual connections, all sub-layers in the model, as well as the embedding layers, produce output data having a same dimension.

Similar to encoder 908, decoder 912 uses stacked self-attention and point-wise, fully connected layers. Decoder 912 can also be a stack of M identical layers (e.g., M=6), and each layer can be a decode block, as illustrated by decode block 912 shown in FIG. 9B. In addition to the two sub-layers (i.e., the sublayer with multi-head attention block 922 and the sub-layer with feed forward block 926) found in encode block 910, decode block 914 can include a third sub-layer, which performs multi-head attention over the output of the encoder stack. The result from the encoder 928 can be input into the multi-head attention block 922. Similar to encoder 908, decoder 912 uses residual connections around each of the sub-layers, followed by layer normalization. Additionally, the sub-layer with multi-head attention block 922 can be modified in the decoder stack to prevent positions from attending to subsequent positions. This masking, combined with the fact that the output embeddings are offset by one position, can ensure that the predictions for position i can depend only on the known output data at positions less than i.

Linear block 916 can be a learned linear transformation. For example, when transformer architecture 900 is being used to translate from a first language into a second language, linear block 916 can project the output from the last decode softmax block 918 into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

Softmax block 918 then turns the scores from linear block 916 into output probabilities 920 (which add up to 1.0). In each position, the index provides for the word with the highest probability, and then maps that index to the corresponding word in the vocabulary. Those words then form the output sequence of transformer architecture 900. The softmax operation is applied to the output from linear block 916 to convert the raw numbers into output probabilities 920 (e.g., token probabilities).

Figure 10:
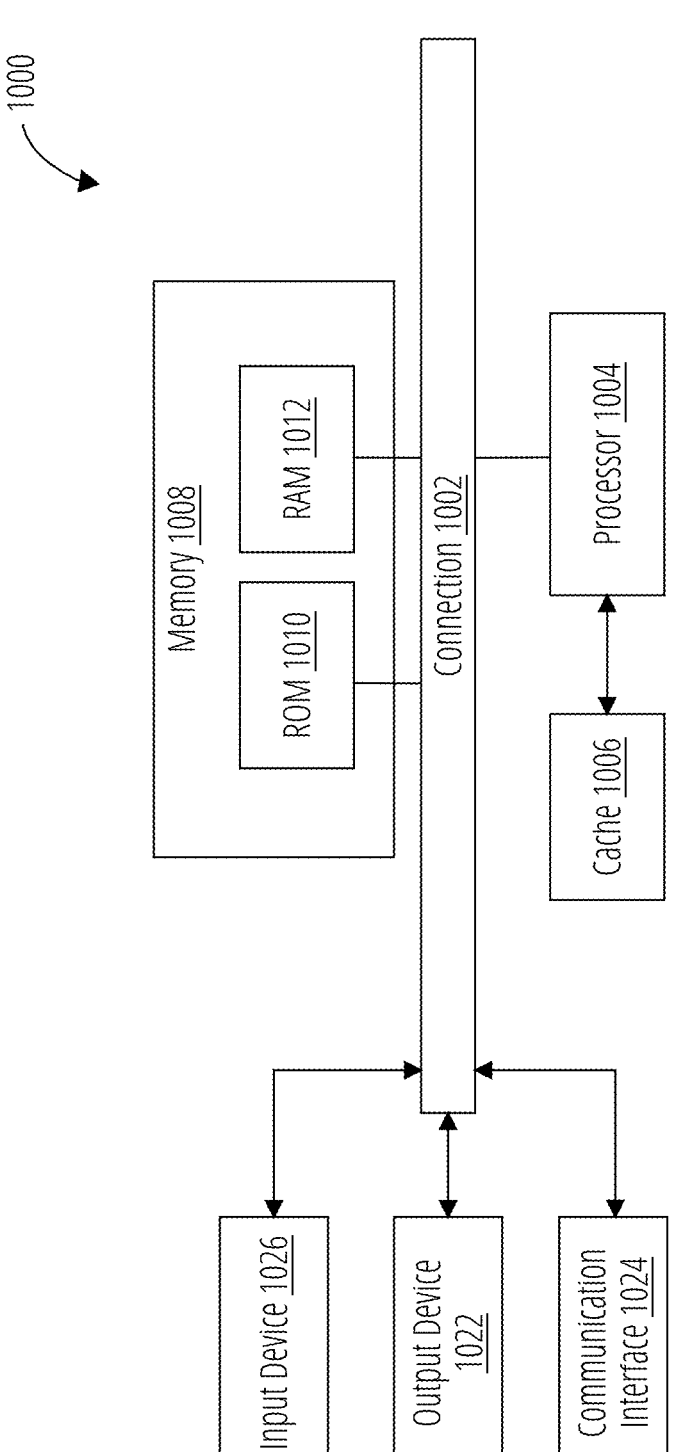
FIG. 10 shows an example of a system for implementing some aspects of the present technology.

FIG. 10 shows an example of computing system 1000, which can be, for example, any computing device making up any engine illustrated in FIG. 1 or any component thereof.

In some aspects, computing system 1000 is a single device, or a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

In some aspects, computing system 1000 may comprise one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYSTEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 1000 includes at least one processing unit (CPU or processor) 1004 and connection 1002 that couples various system components including system memory 1008, such as read-only memory (ROM) 1010 and random access memory (RAM) 1012 to processor 1004. Memory 1008 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Memory 1008 can include software services, servers, logic, etc., that when the code that defines such software is executed by the processor 1004, it causes the system to perform a function. In some aspects, a hardware service that performs a particular function can include the software component stored in a computer-readable medium in connection with the necessary hardware components, such as processor 1004, connection 1002, output device 1022, etc., to carry out the function.

Computing system 1000 can include a cache of high-speed memory 1006 connected directly with, in close proximity to, or integrated as part of processor 1004.

Connection 1002 can be a physical connection via a bus, or a direct connection into processor 1004, such as in a chipset architecture. Connection 1002 can also be a virtual connection, networked connection, or logical connection.

Processor 1004 can include any general purpose processor and a hardware service or software service stored in memory 1008, configured to control processor 1004 as well as a special-purpose processor where software instructions are incorporated into the actual processor design. Processor 1004 may essentially be a completely self-contained computing system, containing multiple cores or processors, a bus, memory controller, cache, etc. A multi-core processor may be symmetric or asymmetric. Processor 1004 can be physical or virtual.

To enable user interaction, computing system 1000 includes an input device 1026, which can represent any number of input mechanisms, such as a microphone for speech, a touch-sensitive screen for gesture or graphical input, keyboard, mouse, motion input, speech, etc. Computing system 1000 can also include output device 1022, which can be one or more of a number of output mechanisms known to those of skill in the art. In some instances, multimodal systems can enable a user to provide multiple types of input/output to communicate with computing system 1000. Computing system 1000 can include communication interface 1024, which can generally govern and manage the user input and system output. There is no restriction on operating on any particular hardware arrangement, and therefore the basic features here may easily be substituted for improved hardware or firmware arrangements as they are developed.

In some aspects, computing system 1000 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some aspects, a service can be software that resides in memory of a client device and/or one or more servers of a content management system and perform one or more functions when a processor executes the software associated with the service. In some aspects, a service is a program or a collection of programs that carry out a specific function. In some aspects, a service can be considered a server. The memory can be a non-transitory computer-readable medium.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

ASPECTS

Aspect 1: A method comprising: receiving, from a client application via an application programming interface (API), a request comprising a prompt for an artificial intelligence (AI) model of a generative response engine and a response ID, wherein the response ID was provided by the AI model in a previous response to identify the previous response; retrieving, by the generative response engine from a database, a chain of responses in a sequence that ends with the response having the response ID, wherein the chain of responses is part of a tree of responses and wherein the chain of responses constitutes a state representation; passing, to the AI model, the prompt and the state representation; and receiving, by the API from the generative response engine, a response to the prompt and a second response ID corresponding to the response output by the AI model, wherein the response is based at least in part on the state representation.

Aspect 2: The method of Aspect 1, wherein the state representation is associated with a state of the AI model at the time of outputting the response associated with the response ID.

Aspect 3: The method of any of Aspects 1-2, wherein the chain of responses is a subset of responses in the tree of responses generated during interactions between a user account and the generative response engine.

Aspect 4: The method of any of Aspects 1-3, wherein a state representation comprises metadata associated with a response of the generative responsive engine, and wherein the metadata comprises one or more function calls of the AI model used in outputting the response.

Aspect 5: The method of any of Aspects 1-4, further comprising: generating a current state representation of a current state of the AI model, wherein the current state representation is associated with a current response ID; and appending the state representation to the tree of responses stored in the database.

Aspect 6: The method of any of Aspects 1-5, wherein the response is added to the tree of responses as a branch from the previous response associated with the response ID.

Aspect 7: The method of any of Aspects 1-6, wherein the response ID can be provided, by the generative response engine to the AI model, to cause the AI model to behave in a context of a state associated with the previous response.

Aspect 8: The method of any of Aspects 1-7, further comprising: passing the response ID to a tool, wherein the tool is selected from a set of tools based on the prompt; and using, by the tool, the chain of responses in a sequence that ends with the response having the response ID to complete a task associated with the prompt.

Aspect 9: A non-transitory computer-readable medium having stored thereon instructions that, when executed by at least one processor, cause the at least one processor to perform operations according to any of Aspects 1 to 8.

Aspect 10: A computing system for performing a function, comprising one or more means for performing operations according to any of Aspects 1 to 8.

Aspect 11: A method for chained tool calls, the method comprising: receiving, by a generative response engine from a client application via an application programming interface (API), a request to respond to a prompt using an artificial intelligence (AI) model of the generative response engine, wherein the prompt defines a task such that responding to the prompt would benefit from the generative response engine calling at least one tool, wherein the tool invocation is integrated into the reasoning framework of the AI model and treated as a core computational capability available during runtime; wherein the AI model is a multi-modal transformer model, wherein the AI model has at least 1 billion parameters, wherein the AI model is a transformer-based language model adapted to accept text, audio, and vision inputs, wherein the AI model is a distilled version of a larger model having at least 1 billion parameters; generating, by AI model of the generative response engine, a first output comprising a call to a first tool of the at least one tool; executing, by the API, the call to the first tool; providing, to the AI model, a result of calling the first tool; generating, by the AI model, a second output that includes an end turn token; and providing, by the AI model, the second output to the client application via the API.

Aspect 12: The method of Aspect 11, wherein the AI model has several tool primitives that the model can call as part of its inference process.

Aspect 13: The method of any of Aspects 11-12, wherein an API service allows multiple outputs, such that the AI model can generate intermittent outputs not provided to the client application.

Aspect 14: The method of any of Aspects 11-13, further comprising: enforcing constrained sampling by the AI model, such that output of the AI model comprises a call to the at least one tool.

Aspect 15: The method of any of Aspects 11-14, wherein the constrained sampling limits sampling of one or more tokens of the output to a tool call of the at least one tool.

Aspect 16: The method of any of Aspects 11-15, wherein the tool call is generated as part of a header of the output.

Aspect 17: The method of any of Aspects 11-16, wherein the at least one tool is specified in the prompt received from the client application.

Aspect 18: The method of any of Aspects 11-17, wherein the end turn token causes the API to provide the second output to the client application.

Aspect 19: The method of any of Aspects 11-18, further comprising: continuously prompting, by an API service, the AI model, wherein the AI model is prompted using a result of calling a respective tool of the at least one tool from a previous turn and wherein the output comprises a tool call; and providing an output comprising the end turn token to the client application via the API service.

Aspect 20: The method of any of Aspects 11-19, wherein the instruction comprises an instruction to call a file search tool and wherein the AI model sequentially outputs responses comprising instructions to call one or more intermittent tools associated with the file search tool until a file search operation is completed.

Aspect 21: The method of any of Aspects 11-20, wherein the responses comprising the instructions to call the one or more intermittent tools are not provided to the client application.

Aspect 22: The method of any of Aspects 11-21, wherein the file search is completed, by the AI model, upon output of the end turn token.

Aspect 23: A non-transitory computer-readable medium having stored thereon instructions that, when executed by at least one processor, cause the at least one processor to perform operations according to any of Aspects 11-22.

Aspect 24: A computing system for performing a function, comprising one or more means for performing operations according to any of Aspects 11-22.

The present technology includes computer-readable storage mediums for storing instructions, and systems for executing any one of the methods embodied in the instructions addressed in the aspects of the present technology presented below:

What is claimed is:

1. A method comprising:

receiving, from a client application via an application programming interface (API), a request comprising a prompt for an artificial intelligence (AI) model of a generative response engine and a first response ID, wherein the first response ID was provided by the AI model in a previous response to identify the previous response;

retrieving, by the generative response engine from a database, a chain of responses in a sequence that ends with the previous response having the first response ID, wherein the chain of responses is part of a tree of responses and wherein the chain of responses constitutes a first state representation;

passing, to the AI model, the prompt and the first state representation, wherein the first state representation is provided in a context window of the AI model;

obtaining, by the AI model, a previous context from the previous response based on the first state representation without replicating a conversation leading to the previous response;

outputting, by the AI model, a response to the prompt and a second response ID corresponding to the response, wherein the response is based at least in part on the previous context; and receiving, by the API from the generative response engine, the response to the prompt and the second response ID.

2. The method of claim 1, wherein the previous response having the first response ID is located in the tree of responses in a position having further responses that that follow the response having the first response ID, and wherein the first state representation is associated with a state of the AI model at the time of outputting the previous response associated with the first response ID and not including updated states associated with the further responses the follow the response having the first response ID.

3. The method of claim 1, wherein the chain of responses is a subset of responses in the tree of responses generated during interactions between a user account and the generative response engine.

4. The method of claim 1, wherein the first state representation comprises metadata associated with the previous response of the AI model, and wherein the metadata comprises one or more function calls of the AI model used in outputting the previous response.

5. The method of claim 1, further comprising:

generating a second state representation of a current state of the AI model when the response associated with the second response ID was output by the AI model, wherein the second state representation is associated with the second response ID; and appending the second state representation to the tree of responses stored in the database.

6. The method of claim 5, wherein the response is added to the tree of responses as a branch from the previous response associated with the first response ID.

7. The method of claim 5, wherein the first response ID can be provided, by the generative response engine to the AI model, to cause the AI model to behave in a context of a state associated with the previous response.

8. The method of claim 1, further comprising:

passing the first response ID to a tool, wherein the tool is selected from a set of tools based on the prompt; and using, by the tool, the chain of responses in the sequence that ends with the previous response having the first response ID to complete a task associated with the prompt.

9. A computing system comprising:

at least one processor; and a memory storing instructions that, when executed by the at least one processor, configure the computing system to:

receive, from a client application via an application programming interface (API), a request comprising a prompt for an artificial intelligence (AI) model and a first response ID, wherein the first response ID was provided by the AI model in a previous response to identify the previous response;

retrieve, from a database, a chain of responses in a sequence that ends with the previous response having the first response ID, wherein the chain of responses is part of a tree of responses and wherein the chain of responses constitutes a first state representation;

pass, to the AI model, the prompt and the first state representation, wherein the first state representation is provided in a context window of the AI model;

obtain a previous context from the previous response based on the first state representation without replicating a conversation leading to the previous response;

output a response to the prompt and a second response ID corresponding to the response, wherein the response is based at least in part on the previous context; and receive, by the API from the AI model, the response to the prompt and the second response ID.

10. The computing system of claim 9, wherein the previous response having the first response ID is located in the tree of responses in a position having further responses that that follow the response having the first response ID, and wherein the first state representation is associated with a state of the AI model at the time of outputting the previous response associated with the first response ID and not including updated states associated with the further responses the follow the response having the first response ID.

11. The computing system of claim 9, wherein the first state representation comprises metadata associated with the previous response of the AI model, and wherein the metadata comprises one or more function calls of the AI model used in outputting the previous response.

12. The computing system of claim 9, wherein the instructions further configure the computing system to:

generate a second state representation of a current state of the AI model when the response associated with the second response ID was output by the AI model, wherein the second state representation is associated with the second response ID; and append the second state representation to the tree of responses stored in the database.

13. The computing system of claim 12, wherein the response is added to the tree of responses as a branch from the previous response associated with the first response ID.

14. The computing system of claim 12, wherein the first response ID can be provided to the AI model to cause the AI model to behave in a context of a state associated with the previous response.

15. A non-transitory computer-readable medium comprising instructions that when executed by at least one processor, cause the at least one processor to:

receive, from a client application via an application programming interface (API), a request comprising a prompt for an artificial intelligence (AI) model and a first response ID, wherein the first response ID was provided by the AI model in a previous response to identify the previous response;

retrieve, from a database, a chain of responses in a sequence that ends with the previous response having the first response ID, wherein the chain of responses is part of a tree of responses and wherein the chain of responses constitutes a first state representation;

pass, to the AI model, the prompt and the first state representation, wherein the first state representation is provided in a context window of the AI model;

obtain a previous context from the previous response based on the first state representation without replicating a conversation leading to the previous response;

output a response to the prompt and a second response ID corresponding to the response, wherein the response is based at least in part on the previous context; and receive, by the API from the AI model, the response to the prompt and the second response ID.

16. The non-transitory computer-readable medium of claim 15, wherein the previous response having the first response ID is located in the tree of responses in a position having further responses that that follow the response having the first response ID, and wherein the first state representation is associated with a state of the AI model at the time of outputting the previous response associated with the first response ID and not including updated states associated with the further responses the follow the response having the first response ID.

17. The non-transitory computer-readable medium of claim 15, wherein the first state representation comprises metadata associated with the previous response of the AI model, and wherein the metadata comprises one or more function calls of the AI model used in outputting the previous response.

18. The non-transitory computer-readable medium of claim 15, wherein the instructions further configure the at least one processor to:

generate a second state representation of a current state of the AI model when the response associated with the second response ID was output by the AI model, wherein the second state representation is associated with the second response ID; and append the second state representation to the tree of responses stored in the database.

19. The non-transitory computer-readable medium of claim 18, wherein the response is added to the tree of responses as a branch from the previous response associated with the first response ID.

20. The non-transitory computer-readable medium of claim 18, wherein the first response ID can be provided to the AI model to cause the AI model to behave in a context of a state associated with the previous response.

\*  \*  \*  \*  \*